United States Patent
Harada

(10) Patent No.: US 6,852,245 B2
(45) Date of Patent: Feb. 8, 2005

(54) PROCESS FOR PRODUCING GRANULES FOR BEING MOLDED INTO FERRITE, GRANULES FOR BEING MOLDED INTO FERRITE, GREEN BODY AND SINTERED BODY

(75) Inventor: Hiroshi Harada, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 10/132,242

(22) Filed: Apr. 26, 2002

(65) Prior Publication Data

US 2002/0190236 A1 Dec. 19, 2002

(30) Foreign Application Priority Data

Apr. 27, 2001 (JP) ........................................ 2001-131470
Apr. 27, 2001 (JP) ........................................ 2001-131471
Apr. 27, 2001 (JP) ........................................ 2001-131472

(51) Int. Cl.$^7$ ................................................ H01F 1/10
(52) U.S. Cl. ................ 252/62.54; 252/62.56; 252/62.57; 252/62.58; 252/62.59; 252/62.9; 252/62.61; 252/62.62; 252/62.63; 252/63.64
(58) Field of Search ............................ 252/62.56, 62.57, 252/62.58, 62.59, 62.6, 62.61, 62.62, 62.63, 62.64, 62.54

(56) References Cited

U.S. PATENT DOCUMENTS 3,860,524 A    1/1975  Goldman 6,337,295 B1    1/2002  Harada
6,596,799 B1 *  7/2003  Harada ........................ 524/431

FOREIGN PATENT DOCUMENTS

| JP | 6-289225 | | 10/1994 |
|---|---|---|---|
| JP | 2000-272970 | * | 10/2000 |
| JP | 2000-323320 | | 11/2000 |
| JP | 2001-57309 | | 2/2001 |
| JP | 2001-60507 | * | 3/2001 |
| JP | 2001-85215 | | 3/2001 |
| JP | 2001-85216 | | 3/2001 |
| JP | 2001-199772 | | 7/2001 |
| JP | 2001-233678 | * | 8/2001 |
| JP | 2001-267116 | * | 9/2001 |

* cited by examiner

Primary Examiner—C. Melissa Koslow
(74) Attorney, Agent, or Firm—Sughrue Mion, PLLC

(57) ABSTRACT

A composition for producing granules for molding ferrite, which comprises a ferrite slurry at least having raw ferrite powders; an ethylene-modified polyvinyl alcohol whose ethylene modified amount is from 4 to 10 mol %, average polymerization degree is from 500 to 1700, and average saponification degree is from 90.0 to 99.5 mol %; and water mixed therewith, ferrite granules produced from the composition, ferrite green body produced from the granules and ferrite sintered body produced from the sintered body are disclosed.

14 Claims, 13 Drawing Sheets

(Example 1) (Comparative Example 4)
FIG. 2A
FIG. 2D
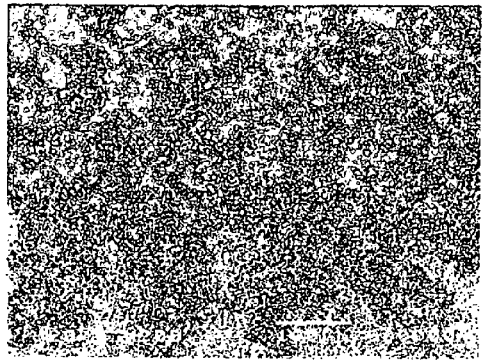 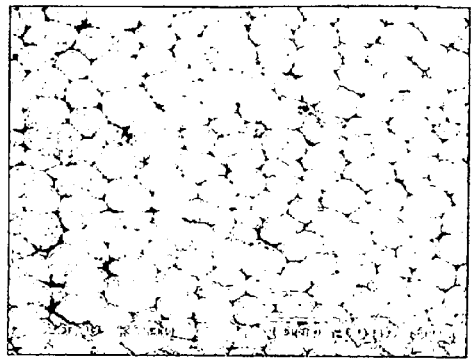
FIG 2B
FIG. 2E
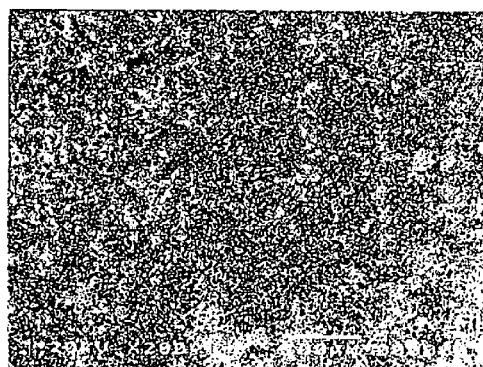 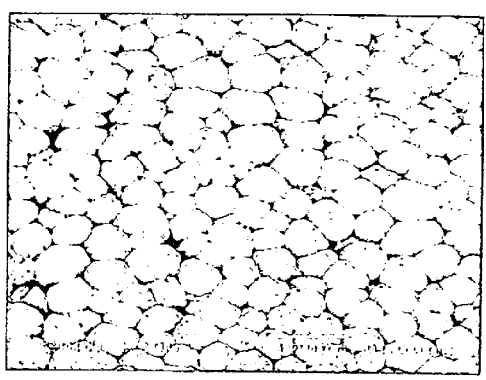
Fig 2C
FIG. 2F
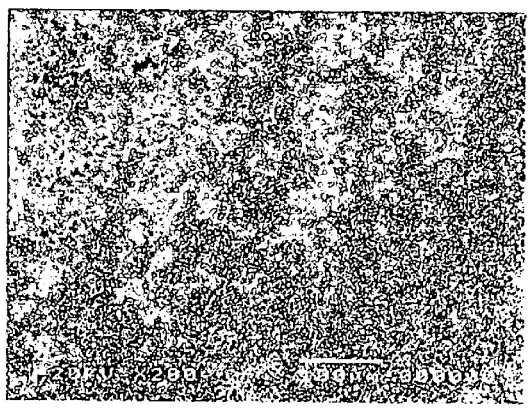 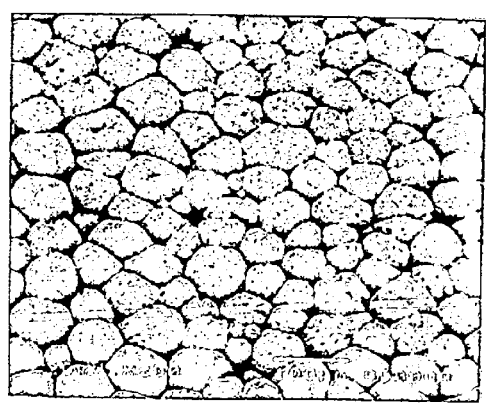

(EXAMPLE 9)

(COMPARATIVE EXAMPLE 9)

(Example 17)

(Comparative Example 14)

(EXAMPLE 25) (COMPARATIVE EXAMPLE 19)
FIG. 13A  FIG. 13D
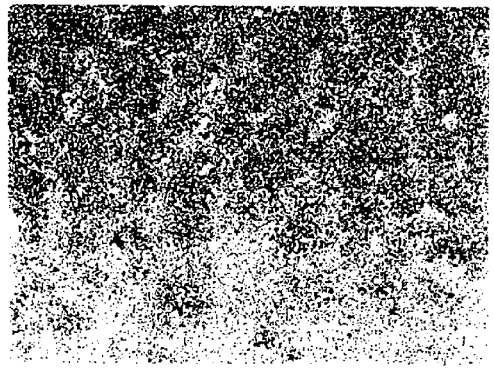 
FIG. 13B  FIG. 13E
 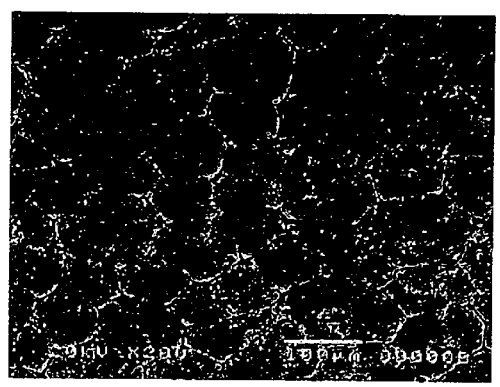
FIG. 13C  FIG. 13F
 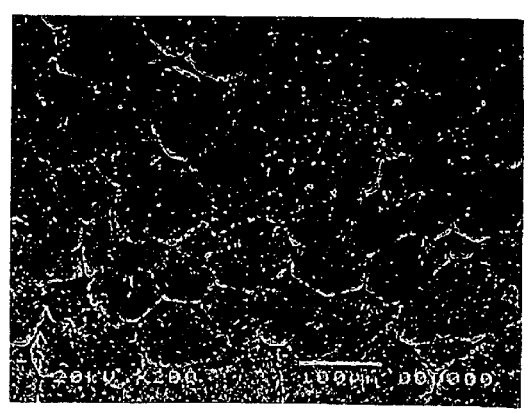

PROCESS FOR PRODUCING GRANULES FOR BEING MOLDED INTO FERRITE, GRANULES FOR BEING MOLDED INTO FERRITE, GREEN BODY AND SINTERED BODY

BACKGROUND OF THE INVENTION

1. Field of the Invention

The present invention relates to a process for producing granules for molding ferrite capable of obtaining a ferrite green body excelling in molding properties, the granules for molding ferrite capable of obtaining a ferrite green body obtainable from the same, a ferrite green body and a ferrite sintered body.

2. Description of the Related Arts

Ferrite has been widely utilized in various fields including electronic parts. The ferrite is obtainable by granulating raw ferrite powder together with a binder into ferrite granule to obtain a ferrite green body and sintering the resulting ferrite green body.

Conventionally, various processes have been applied to produce a ferrite green body. Amongst them, a dry molding process under a pressure has generally been performed.

For example, a ferrite green body is produced by preparing a ferrite slurry from raw ferrite powders and water, spray-drying the resulting slurry through a spray dryer to produce granules for molding ferrite, which is formed under a pressure.

Alternatively, ferrite granules for molding are granulated by stirring and mixing the raw ferrite powders and the binders, and the repeating drying and oscillating extrusion. The term "oscillating extrusion" used herein is a process in which, for example, particles granulated for example with several mm are crushed on a net, and finely divided particles are dropped, these operations are repeated with using nets with finer mesh in several stages whereby particles having a prescribed size are obtained.

The granules for molding ferrite (hereinafter referred to as "ferrite granules") are required to have the following properties in order to produce a ferrite green body.

(1) The ferrite granules should have flowability within a suitable range, and a good packing property during the course of packing the ferrite granules into a mold in a uniform manner.
(2) The ferrite granules should be crushed at a low pressure (typically from 29 to 147 MPa) during the course molding (hereinafter referred to as "a crushing property at a low pressure").
(3) Ingredients such as fine particles contained in the ferrite granules should not be stuck to a mold or the like (hereinafter referred to as "anti-sticking properties").
(4) The ferrite granules are not collapsed during the course of the storage, transportation, agitation when they are packed into a mold, or due to collision with each other (hereinafter referred to as "an anti-collapse property").
(5) The ferrite granules have suitably bulk density so that they flow out of the mold during the course of packing them into a mold, or of molding (hereinafter referred to as "a mold-packing property")

In order to satisfy these requirements, various processes for granulating the ferrite granules have been suggested. For example, Japanese Patent Laid-Open Publication No 4-137704 discloses a process in which ferrite granules are granulated through an atomizer at a granulation temperature of from 270 to 290° C. to adjust the water content of from 0.5 to 0.7% and Japanese Patent Laid-Open No 10-38460 discloses a process in which a binder is sprayed onto granulating powders within a sprayer dryer.

Japanese Patent Laid-Open No. 2000-272970 discloses a process utilizing a polyvinyl alcohol polymer component containing α-olefin with up to 4 carbon atoms or containing a vinyl ether as a binder.

However, these prior techniques, which can improve the strength of the ferrite green body, are disadvantageous in that the resulting ferrite granules are rigid, has a poor crushing property at a low pressure, and many boundary deficiencies remain in the resulting ferrite green body. Consequently, these prior arts do not give any satisfactory effects in terms of strength and dielectric characteristics of the ferrite sintered body.

Also, these techniques have the following drawbacks.

a. These techniques relate to improvement of ferrite slurry, the granulation process applicable to these techniques is restricted to a spray-drying granulation process using a spray dryer and, thus, these techniques are of low flexibility.
b. Although the flowability and the crushing property at a low pressure of the ferrite granules are somewhat improved, the something to further improved has been still left. Also, the molded product produced by the use of such ferrite granules has insufficient dimensional accuracy. Further, these ferrite granules are not suitable for producing a ferrite product having a complicated shape.
c. The ferrite granules are sometimes collapsed during the course of the storage, transportation, or packing them into a mold.
d. When being molded in a mold, the fine ferrite particles are stuck to the mold, causing sticking, which in some cases makes it impossible to continuously produce ferrite green bodies.
e. The resulting ferrite green body is poor in the mechanical strength and there is tendency that defective such as chipping or breaking will easily occur.
f. The dielectric characteristics of the resulting ferrite sintered body, particularly magnetic loss cannot be obtained in a sufficient manner.
g. The ferrite green body resulting from the granules only have a poor mold release property so that crack tends to occur in the interior of the ferrite green body due to the spring back.

The term spring back (swelling of volume" used herein the volume of ferrite green body is swelled during the course of subtracting the ferrite green body from a mold to be larger than the size of the mold.

SUMMARY OF THE INVENTION

Consequently, the first object of the present invention is to provide ferrite granules excelling in flowability, a property for being packed into a mold, and a crushing property at a low pressure.

The second object of the present invention is to provide a ferrite green body having high green body strength and a sintered ferrite body sintering the same.

The further object of the present invention is to provide a ferrite sintered body with low water absorbency and lowered magnet loss.

We have made serious studies and researches, resulting in the present invention based on the discovery that when the granulation of ferrite granules is performed using a specific binder component under specific spray-drying conditions, these and other objects can be solved.

Still another object of the present invention is to provide a uniform, highly dense ferrite green body having good mold-releasing property and free of mold defective e.g., cracking caused due to the spring back, a ferrite sintered body produced therefrom and a process for producing the same.

We have continuously studies in research. As a result it has been found that when at least parts of the surfaces of such ferrite granules are covered with hexitan higher aliphatic acid ester having hydrophilicity/hydrophobicity ratio (hereinafter abbreviated as "HLB") of 14 or lower, the object described above can be attained. The present invention has been accomplished based on this finding.

The present invention, generally relates to a composition for producing granules for molding ferrite, which comprises a ferrite slurry at least having
- raw ferrite powders;
- an ethylene-modified polyvinyl alcohol whose ethylene modified amount is from 4 to 10 mol %, average polymerization degree is from 500 to 1700, and average saponification degree is from 90.0 to 99.5 mol %, preferably from 92 to 97 mol %; and
- water mixed therewith.

The amount of the ethylene-modified polyvinyl alcohol added is preferably from 0.4 to 5 parts by weight based on 100 parts by weight of the raw ferrite powder.

The composition according to the present invention may further comprise 0.1 to 0.5 parts by weight of a polyethylene glycol having a molecular weight of from 1000 to 6000 based on 100 parts by weight of the raw ferrite powder.

Also, the composition according to the present invention may further comprise 0.1 to 1 parts by weight of water-dispersible wax based on 100 parts by weight of the raw ferrite powder.

The present invention also relates to a process for producing ferrite granules by granulating a composition for producing granules for molding ferrite, which uses the composition of the present invention.

In the process of the present invention, the composition may be granulated by a stirring granulation process utilizing a stirring granularator, or by a spray drying process using a spray dryer.

In a preferred aspect of the present invention, the composition may be granulated by a spray drying process using a spray dryer under the conditions that the inlet temperature of the spray dryer is in the range of from 170 to 230° C. and the outlet temperature of the spray dryer is in the range of from 65 to 125° C.

The present invention also relates to ferrite granules for molding ferrite granulated by a process according the present invention.

In a specific aspect, the ferrite granules of the present invention, at least part of the surface is covered with hexitan higher aliphatic acid ester having a hydrophilicity/oilphilicity ratio of 14 or less.

In addition, the present invention relates to a ferrite green body produced by dry-pressing ferrite granules of the present invention.

Also, in a specific aspect of the present invention, the ferrite sintered body of the present invention has a water absorbency of not less than 0.2% by weight.

In this aspect, the ferrite sintered body comprises an Mn—Zn ferrite or Mn—Mg—Zn ferrite, and which is used for a deflecting yoke, or comprises an Mn—Zn ferrite, and which is used for a transformer.

BRIEF DESCRIPTION OF THE DRAWINGS

FIG. 2 shows the results of the observation where the situations of the granules were observed by a scanning electron microscope (SEM), wherein FIGS. 2A, 2B and 2C each shows sides of an upper portion, a middle portion and a lower portion of the ferrite granule obtained under the conditions of Example according to the first aspect of the present invention, and FIGS. 2D, 2E and 2F each shows sides of an upper portion, a middle portion and a lower portion of the ferrite granule obtained under the conditions of Comparative Example.

FIG. 13 shows the results of the observation where the situations of the granules were observed by a scanning electron microscope (SEM) according to the third aspect of the present invention.

DETAILED DESCRIPTION OF THE INVENTION

Preferred embodiments of the present invention will now be described.
(First Aspect)

The ferrite granules of the present invention are mainly comprised of raw ferrite powders and a binder component. The raw ferrite powders in the present invention can be suitably selected depending upon the application of the sintered ferrite bodies, which are finally produced, and include, but are not restricted to, those which comprises one or a mixture of $Fe_2O_3$, NiO, MnO, MgO, CuO, or ZnO as a main ingredient and which may contain a metal oxide or oxides of Co, W, Bi, Si, B, Zr, and the like as subcomponents or unavoidable impurities.

The particle size of the raw ferrite powder may be within the range conventionally used as raw materials for sintered ferrite bodies, and generally is in the range of from 0.5 to 5 μm, preferably from 0.7 to 3 μm. The particle size of the raw ferrite powder within the above range can be attained by any of the conventionally known processes including the pulverization of the raw ferrite powder by means of a ball mill, a stirring mill, an atoliter, and the like. The pulverization may also be performed in a wet or dry process.

The ferrite granules of the present invention are produced by granulating the raw ferrite powders through an atomizer under the conditions where an inlet temperature of the granulator is in the range of from 170 to 230° C. and an outlet temperature thereof is in the range of from 65 to 125° C. The temperature conditions have an influence upon the crushing property at a low pressure of the ferrite granule, the strength of the green body, and the dielectricity of the sintered body.

Figure 3:
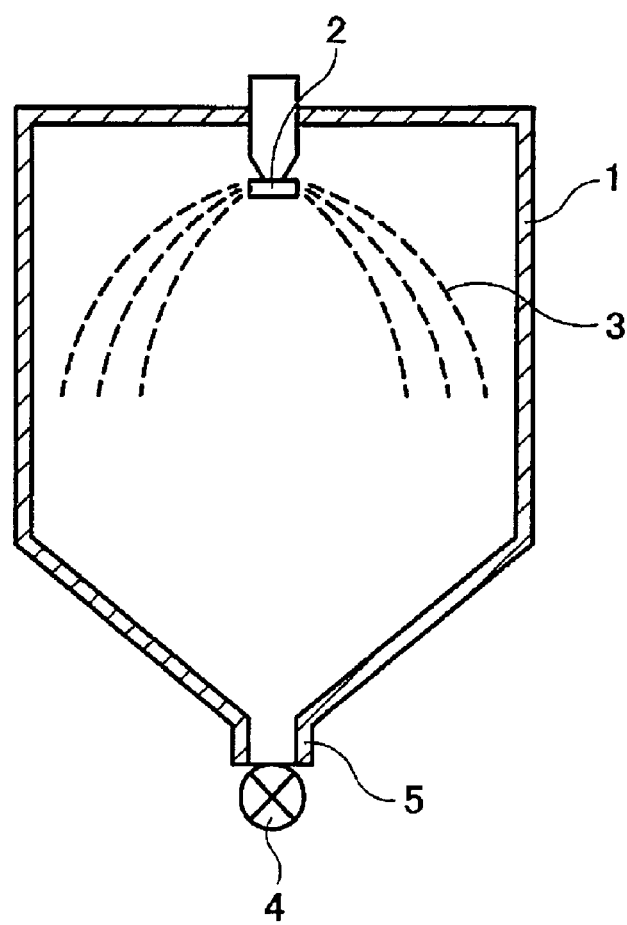
FIG. 3 shows aschematic view of a spray drying granulator.

Referring to FIG. 3, the inlet and the outlet temperature will be described. FIG. 3 is a schematic view of a spray drying granulator. The spray drying granulator has a chamber 1 having a disc type atomizer 2 for spraying a ferrite slurry into the chamber provided on a top thereof. Upon spraying the ferrite slurry into the chamber 1, the solvent contained in the slurry is distilled in the air atmosphere whereby granules are generated, which are deposited around an outlet 5. As occasion may demand, a valve 4 may be released to take the deposited granules out of the chamber 1.

The inlet term used herein indicates a temperature at the time when the ferrite slurry 3 is sprayed into the chamber 1. Specifically, the inlet chamber is a temperature of an atmosphere around the disc type atomizer 2 shown in FIG. 3.

More particularly, when the granulation in a spray drying manner at a high temperature of 280° C. taught in the prior art (Japanese Patent Laid-Open Publication No. 4-137704) is performed, due to sudden drying, the binder component is also migrated to the surface of the droplet together with the distillation of water, which is the solvent, the resulting ferrite granules become uneven, i.e., portions where the concentration of the binder is high occur on the surface of the ferrite granule while portions where no or little binder exists occurs within the interior of the granule. Since the ferrite granules obtained according to the prior art in which the binder component is enriched in the surface layer is too rigid and, thus, has poor crushing property at a low pressure, if the ferrite granules are molded, granule boundary, i.e., internal defect remains in the resulting ferrite green body.

The term "granule boundary" used herein means gaps generated between the ferrite granules within the interior of the ferrite green body. If the ferrite granules are sufficiently in contact with each other within the interior of the ferrite green body, the granule boundary becomes small, while if they are in contact with each other only in a poor manner, the granule boundary becomes large.

In contrast to the prior art, the migration and segregation of the binder component can be suppressed under the granulation temperature conditions according to the present invention and, therefore, upon molding the ferrite granules of the present invention, which are relatively soft and excel in the crushing property at a low pressure, a ferrite green body having little granule boundary can be obtained.

Specifically, the granulation temperature conditions in the present invention are preferably such that the temperature at the inlet of the spray drying granulator is in the range of from 170 to 230° C. (preferably from 170 to 210° C.), and the temperature at the outlet of the spray drying granulator is in the range of from 65 to 125° C. (preferably from 70 to 110° C.). If the inlet temperature is not more than 230° C. and the outlet temperature is not more than 125° C., the resulting granules are soft and excel in the crushing property at a low pressure.

If the inlet temperature is not less than 170° C. and the outlet temperature is not less than 65° C., the drying well progresses to suppress the aggregation of the ferrite granules, resulting in granules having small water content and little adhesion property.

The atomizer for use in the granulation of the ferrite granule according to the present invention is not specifically restricted as long as it can conventionally be used in the spray drying granulation, and an atomizer having a two-fluid nozzle, a disc type atomizer or such can be used. Preference is given to use a disc type atomizer in the present invention. The use of the disc type atomizer is advantageous in the fact that the particle size can be controlled by the diameter of the disc and the revolution number and the particle distribution of the resulting ferrite granules can make narrow.

In the present invention, the ferrite granules is preferably in a spherical form having the particle size ranging from 30 to 400 $\mu$m, more preferably 70 to 150 $\mu$m.

It is preferable for obtaining such ferrite granules having a specific form and a specific particle size to set the disc diameter of the atomizer at the range of from 80 to 125 nm and set the revolution number of the atomizer at the range from 3,000 to 20,000.

If the average particle size of the ferrite granules is not less than 30 $\mu$m, the ferrite granules excels in flowability and packing ability into a mold, which can suppress the unevenness of the size and weight of the ferrite green body low.

If the particle size of the ferrite granule is set at the range from 50 to 200 $\mu$m, preferably from 70 to 150 $\mu$m, the effects mentioned above can further be enhanced.

According to the present invention, in order to obtain the ferrite granules having such a shape and particle size, preference is given to set the diameter of the disc at a range of from 80 to 125 mm and to set the rotation speed of the atomizer at a range of from 3000 to 20000 rpm.

If the particle size of the ferrite granule is not less than 30 $\mu$m, the ferrite granules excel in flowability and a packing property into a mold, as well as the variation in the weight of the ferrite granules can be suppressed low. Also, in this case, it can suppress the sticking of fine particles onto a mold. In addition, if the average particle size of the ferrite granules is not more than 400 $\mu$m, the ferrite green body formed from the ferrite granules has a less granule boundary, which makes it possible to the rate of generating defective products low. Also, in this case, the variation of the size and weight of the ferrite green body can be suppressed low.

If the particle size of the ferrite granules is set in the range of from 50 to 200 $\mu$m, more preferably from 70 to 150 $\mu$m, the effects described above can further be enhanced.

In the ferrite granules according to the first aspect of the present invention, a specific saponified product of polyvinyl alcohol is added as a binder component. In general, the binder component acts as a binding agent for primary particles, i.e., a binding agent for biding the raw ferrite powders to each other, and has an influence upon a crushing property, anti-collapse property of the ferrite granules and the strength of the ferrite green body.

Specifically, the polyvinyl alcohol according to the present invention is an ethylene modified polyvinyl alcohol and is preferably has an average polymerization degree of from 500 to 1700 and an average saponification degree of from 90.0 to 99.5 mol %. If the average polymerization degree is not less than 500, an anti-collapse property and an anti-sticking property can be maintained at a practically sufficient level while maintaining a crushing property of the ferrite granules at a good level. If the average polymerization degree is not more than 1700, the ferrite granules can be made soft while maintaining the anti-collapse property of the ferrite granules and, thus, a crushing property at a low pressure can be obtained at a practically sufficient level.

A more preferable range of the average saponification degree is from 92 to 97 mol %. There is a tendency that higher the average saponification degree, harder the granulated ferrite granules are. An ethylene modified polyvinyl alcohol having an average saponification degree of not less than 90 mol % has practically sufficient water solubility. If the average saponification degree is not more than 99.5 mol %, the softness of the resulting ferrite granule is within a practically tolerable level.

If the average saponification degree is from 92 to 97 mol %, ferrite granules having softness as the ferrite granules and the strength of the ferrite green body produced therefrom in a well-balanced manner can be obtained.

The modification amount of ethylene in the ethylene modified polyvinyl alcohol, which can exhibit practically tolerable water solubility, is not less than 20 mol %, and is preferably from 4 to 10 mol %. If the ethylene modification amount of the ethylene modified polyvinyl alcohol is from 4 to 10 mol %, a binder solution comprising such an ethylene modified polyvinyl alcohol excels in the stability of the binder solution and, thus, the binder solution after it becomes a coat which covers the raw ferrite powders has excellent strength.

The amount of the ethylene modified polyvinyl alcohol used as the binder component is preferably from 0.4 to 5 parts by weight, and particularly from 0.6 to 2 parts by weight. If the amount of the ethylene modified polyvinyl alcohol is not less than 0.4 parts by weight, the ferrite granules can be surely granulated. If the amount of the ethylene modified polyvinyl alcohol is not more than 5 parts by weight, the ferrite granules granulated do not so hard and can maintain their good crushing property at a low pressure. Accordingly, when the ferrite granules are molded, the resulting ferrite green body has a less granule boundary, which makes it possible to the rate of generating defective products low. Similarly, in this case, volume deficiency can be prevented.

The amount not less than 0.6 parts by weight suppresses the generation of fine holes, i.e., clearance, on the surfaces of the ferrite granules, making it possible to granulates highly dense ferrite granules. The amount of not more than 2 parts by weight makes it possible to granulate ferrite granules having softness as the ferrite granules and mechanical strength in a well-balanced manner.

In the present invention, polyethylene glycol to be added to the ferrite slurry serves as a plasticizer in the granules for molding ferrite, and improves a crushing property at a low pressure and a pressure transmitting property to thereby decrease the formation of granule boundary.

The molecular weight of polyethylene glycol is preferably from 1000 to 6000, and more preferably from 2000 to 4000. The molecular weight of not less than 1000 can impart hygroscopicity to the ferrite granules while maintaining a practically sufficient level of a crushing property at a low pressure. Accordingly, good flowability of the granules and uniform packing of the granules into a mold can be obtained in such a case. If adding polyethylene glycol having a molecular weight is not more than 6000 improves a crushing property and suppress the generation of crack due to the decreasing of the ferrite green body's strength.

If the molecular weight of polyethylene glycol having a molecular weight in the range of from 2000 to 4000, low hygroscopicity and a crushing property at a low pressure can be consistent with each other in a much better level.

The water dispersible wax to be added to the ferrite slurry serves as a lubricant in the granules for molding ferrite, decreases the abrasion between the granules for molding ferrite and a mold, which has an influence upon a crushing property at a low pressure and spring back (swelling of green body). An average particle size of the water dispersible wax is preferably not more than 1 µm, and the amount of the water dispersible wax added is preferably from 0.1 to 1 parts by weight based on 100 parts by weight of the raw ferrite powders.

If the amount of the water dispersible wax is not less than 0.1 parts by weight, an anti-abrasion effect can be obtained at a practically tolerable level. If the amount is not less than 1 part by weight, the formation of the minute gaps produced due to the evaporation of the water dispersible wax can be suppressed.

Also, if the average particle size of the water dispersible wax is not more than 1 µm, in which case, the size of the water dispersible wax is similar to that of the raw ferrite powders, the water dispersible wax can be uniformly mixed with the raw ferrite powders. Furthermore, if the average particle size of the water dispersible wax is not more than 1 µm, the track of the water dispersible wax remaining as gaps in the sintered ferrite body can be suppressed when the ferrite green body is sintered.

Examples of the water dispersible waxes include, but are not restricted to, microcrystalline wax, paraffin wax, polyethylene wax, oxidized polyethylene wax, and glycol-modified oxidized polyethylene, with the use of microcrystalline wax being preferred. The microcrystalline wax, which can be preferably used herein, is a fine crystalline wax having a molecular weight of from approximately 500 to 800 comprising isoparaffin and/or cycloparaffin with 30 to 60 carbon atoms as a main component.

The water dispersible wax may be used singly or as a combination of two or mote thereof.

The term "spring back" used herein means a phenomenon that a ferrite green body, when taken out from a mold, is volumetrically swelled to be a size larger than the size of the mold.

In the present invention, various optional additives may be added at the time of the granulation within a scope that they does not impair the objects and effects of the present invention. Typical examples of the additives are dispersing agents such as polycarboxylates, and condensed naphthalene sulfonic acid; plasticizers such as glycerin, glycols, and triols; lubricants such as waxes, and stearic acid and salts thereof; organic macromolecular aggregating agents such as polyetehr-, urethane modified polyether-, polyacrylic acid-, and modified acrylic acid-macromolecules; inorganic aggregating agents such as aluminum sulfate, aluminum chloride, and aluminum nitrate; and the like.

The terms "the range for maintaining a flowability sufficient for incorporating the ferrite granule in the mold for the ferrite production" used herein is intended to a range in which the ferrite granule to be packed can be uniformly packed in the mold without sticking the granules to the filling means and aggregating the ferrite granules. In general, the surface of the ferrite granule is required to be dried enough for maintaining the flowability.

As for the flowability of the ferrite granule, although it cannot be decided unconditionally because it depends upon the process to be granulated, i.e., shape of the ferrite granule, but in the present invention, a time (second/50 g) required for dropping 50 g of the ferrite granules from a funnel is utilized as a standard for the flowability as defined in JIS Z-2502. The flowability of the ferrite granule produced by a spray drying process is preferably in the range of from 18 to 24 seconds/50 g, and the ferrite granules according to the present invention has the flowability within this range.

(Second Aspect)

The second aspect of the present invention will now be described. In this aspect, the description of the same portions as those of the first aspect will be omitted.

The feature of the ferrite sintered body according to the second aspect is that water absorbency of the resulting ferrite sintered body is not more than 0.2% by weight.

According to my research, it has been discovered that the water absorbency of the ferrite sintered body can be used as a standard for magnetic loss.

The relation between the water absorbency and the magnetic loss can be easily considered through the granule boundary in the interior of the ferrite sintered body. The term granule boundary used herein is intended to means gaps occurring on the surfaces of the granules in contact with each other. If the ferrite granules are well brought into contact with each other in the ferrite sintered body, the granule boundary becomes small. If they are poorly brought into contact with each other, the granule boundary becomes large. If the granule boundary is large, the moisture enters therein and, thus, the water absorbency becomes large. This indicates that many defectives due to the gaps exist in the ferrite sintered body and, thus, the magnetic loss becomes large. Conversely, if the granule boundary is small, the moisture enters in the granule boundary only with difficulty and, thus, the water absorbency becomes small. This indicates that there is small granule boundary in the ferrite sintered body and, thus, the magnetic loss is decreased.

The term "magnetic loss" used herein indicates an amount of electric power which will be absorbed in a magnet when a magnetic field which timely varies is applied to the magnet. Unless otherwise noted, in the present invention, a magnetic loss Pcv per unit volume (core loss volume density) is used as the "magnetic loss".

In the ferrite sintered body and the process for producing the same according to the present invention, when the water absorbency of the ferrite sintered body is not more than 2% by weight, a ferrite sintered body having good characteristics 4' such as low magnetic loss can be obtained. From the viewpoint of decreasing the magnetic loss, it is preferable that the water absorbency of the ferrite sintered body is as small as possible. The water absorbency of not more than 1% by weight is much more suitable.

The ferrite granules of the present invention are mainly comprised of raw ferrite powders and a binder component. The raw ferrite powders in the present invention can be suitably selected depending upon the application of the sintered ferrite bodies, which are finally produced, and not specifically restricted. For example, the ferrite sintered body for use in a deflecting yoke comprises $Fe_2O_3$, MnO, MgO, and ZnO as main components. A ferrite sintered body for a transformer comprises $Fe_2O_3$, NiO, MnO, and ZnO as main ingredients. Optionally, the ferrite sintered body may contain a metal oxide or oxides of Co, W, Bi, Si, B. Zr, and the like as subcomponents or unavoidable impurities.

The particles size of the raw ferrite powders is substantially the same as that in the case of first aspect.

In the ferrite granules according to the second aspect of the present invention, a specific saponified product of polyvinyl alcohol is added as a binder component similar to the first aspect of the present invention.

Specifically, the polyvinyl alcohol according to the present invention is an ethylene modified polyvinyl alcohol and is preferably has an average polymerization degree of from 500 to 1700 and an average saponification degree of from 92 to 97 mol %. If the average polymerization degree is not less than 500, an anti-collapse property and an anti-sticking property can be maintained at a practically sufficient level while maintaining a crushing property of the ferrite granules at a good level. If the average polymerization degree is not more than 1700, the ferrite granules can be made soft while maintaining the anti-collapse property of the ferrite granules and, thus, a crushing property at a low pressure can be obtained at a practically sufficient level.

A more preferable range of the average saponification degree is from 93 to 96 mol %. There is a tendency that higher the average saponification degree, harder the granulated ferrite granules are. An ethylene modified polyvinyl alcohol having an average saponification degree of not less than 92 mol % has practically sufficient water solubility. If the average saponification degree is not more than 97 mol %, the softness of the resulting ferrite granule is within a practically tolerable level.

If the average saponification degree is from 93 to 96 mol %, ferrite granules having softness as the ferrite granules and the strength of the ferrite green body produced therefrom in a well-balanced manner can be obtained.

The modification amount of ethylene in the ethylene modified polyvinyl alcohol, which can exhibit practically tolerable water solubility, is not less than 20 mol %, and is preferably from 4 to 10 mol %, similar to the first aspect.

The amount of the ethylene modified polyvinyl alcohol used as the binder component is preferably from 0.4 to 5 parts by weight, and particularly from 0.6 to 2 parts by weight, similar to the first aspect.

In this aspect, polyethylene glycol to be added to the ferrite slurry serves as a plasticizer in the granules for molding ferrite, and improves a crushing property at a low pressure and a pressure transmitting property to thereby decrease the formation of granule boundary as in the first aspect.

In this aspect, the modification amount of ethylene in the ethylene modified polyvinyl alcohol, which can exhibit practically tolerable water solubility, is also not less than 20 mol %, and is preferably from 4 to 10 mol %.

In this aspect, the amount of the ethylene modified polyvinyl alcohol used as the binder component is preferably from 0.4 to 5 parts by weight, and particularly from 0.6 to 2 parts by weight similar to the case of the first aspect.

Furthermore, the molecular weight of polyethylene glycol is preferably from 1000 to 6000, and more preferably from 2000 to 4000 similar to the case of the first aspect.

The water dispersible wax to be added to the ferrite slurry serves as a lubricant in the granules for molding ferrite, decreases the abrasion between the granules for molding ferrite and a mold, which has an influence upon a crushing property at a low pressure and spring back (swelling of green body). In this aspect, the dispersible wax similar to that of the first aspect can be used.

The water dispersible wax may be used singly or as a combination of two or more thereof.

In this aspect, the ferrite granules preferably have globular shape having an average of from 30 to 400 μm, and more preferably from 70 to 150 μm similar to the first aspect of the present invention.

Similar to the first aspect of the present invention, various optional additives may be added at the time of the granulation within a scope that they does not impair the objects and effects of the present invention.

The terms "the range for maintaining a flowability sufficient for incorporating the ferrite granule in the mold for the ferrite production" used herein is intended to a range in which the ferrite granule to be packed can be uniformly packed in the mold without sticking the granules to the filling means and aggregating the ferrite granules. In general, the surface of the ferrite granule is required to be dried enough for maintaining the flowability.

As for the flowability of the ferrite granules, although it cannot be decided unconditionally because it depends upon the process to be granulated, i.e., shape of the ferrite granule, but in the present invention, a time (second/50 g) required for dropping 50 g of the ferrite granules from a funnel is utilized as a standard for the flowability as defined in JIS Z-2502. The flowability of the ferrite granule produced by a spray drying process is preferably in the range of from 18 to 24 seconds/50 g, and that produced by an oscillating extruding process is preferably from 20 to 34 seconds/50 g.

The ferrite sintered body according to the second aspect of the present invention is produced by molding the ferrite granules of the present invention into a ferrite green body, followed by sintering it.

(Third Aspect)

Since the configuration of the ferrite granules, the ferrite green body and the ferrite sintered body according to the third aspect of the present invention is substantially the same as that of the first and second aspects, except for the addition of a hexitan higher fatty acid ester, a hexitan higher fatty acid ester will be described, and the details of any other constituents of the third aspect will be omitted.

The amount of the hexitan higher fatty acid ester to be added is preferably from 0.1 to 3.0 parts by weight based on 100 parts by weight of the ferrite granules. The hexitan higher fatty acid ester is preferably the ester of a higher fatty acid having 12 to 18 carbon atoms. Particularly, the higher fatty acid is preferably oleic acid, stearic acid, or palmitic acid. Also, the hexitan is preferably sorbitan or mannitan.

The amount of the hexitan higher fatty acid ester is not less than 0.1 parts by weight will obtain an excellent crushing property at a low pressure, improves lubricity, flowability and a pressure-transmitting property, making I it possible to pack the ferrite granules into a mold in a good manner. In this case, since the decreasing of the green body's strength is low, molding deficiency such as chipping and cracking can be suppressed. As a result, ferrite granules giving a ferrite green body with low unevenness at a low pressure can be obtained.

If the amount exceeds 3.0 parts by weight, no additional effect can be obtained. Rather, it would occur a disadvantage that the strength of the resulting ferrite green body is significantly decreased, and is disadvantageous in terms of an economic viewpoint. Considering the effect and the cost, the amount of the hexitan higher fatty acid ester is preferably in the range of from 0.2 to 2.0 parts by weight, and particularly from 0.3 to 1.5 parts by weight.

By restricting the amount of the hexitan higher fatty acid ester, ferrite granules having well-balanced lubricity and the mechanical strength of the ferrite green body can be obtained.

The term "hexitan" used herein is an intermolecular ether obtained by dehydrating one water molecule from hexitol, i.e., sugar alcohol of hexose, and the term "higher aliphatic acid ester thereof" means part(s) or whole of four hydroxyl groups form higher aliphatic acid esters.

On the estimation of wide variety of the hexitan higher fatty acid esters, it has been proven that a higher aliphatic acid having 12 to 18 carbon atoms is preferable, which may be saturated or unsaturated, and may comprise a straight chain or a branched chain. Examples of the higher aliphatic acids which can be used in the present invention include lauric acid, myristic acid, palmitic acid, stearic acid, and oleic acid, with the use of palmitic acid, stearic acid and oleic acid being having been proven to be particularly preferable.

Examples of the hexitans which can be used in the present invention include sorbitan, manitan, and dulucitan, and amongst them, it has been clarified that sorbitan and manitan is preferable and sorbitan is particularly preferable.

In the present invention, the hexitan ester of the higher fatty acid may be either partially esterified product or wholly esterified product, and it has been proven that the effect of the present invention can be obtained when one of these esters is used alone or two or more are used in combination.

The hexitan ester of the higher fatty acid used in the present invention preferably has an HLB value of not more than 14. If the HLB value is not more than 14, the a ferrite green body having a practically sufficient strength can be obtained, while maintaining the mold releasing property and the crushing property at a low pressure.

In order to produce ferrite granules in which at least parts of the surfaces thereof are covered with the hexitan higher fatty acid ester, the ferrite granules obtained after being granulated from the raw ferrite powders are preferably come into contact with the hexitan higher fatty acid ester having an HLB value of not more than 14.

If the hexitan higher fatty acid ester is formulated into the raw ferrite powders before granulation, the mold releasing property of the ferrite green body cannot be improved in a sufficient manner, product defect due to spring back, and it becomes difficult to obtain a highly dense ferrite green body.

In order to cover the ferrite granules with the hexitan higher aliphatic acid ester, for example, the hexitan higher aliphatic acid ester is optionally diluted about 1.5 to 3 times with a solvent such as ethyl alcohol, and the diluted ester is added to the ferrite granules and then mixed by using a mixer such as a drum mixer. Alternatively, a rolling fluidizing layer may be used to bring the ferrite granules into contact with the hexitan higher aliphatic acid ester while fluidizing the ferrite granules, followed by removal of the solvent. Also, a process in which a solution of the hexitan higher aliphatic acid ester is atomized to be added to the ferrite granules, and a process in which the hexitan higher aliphatic acid ester, which is in the solid state or a molten state is added to the ferrite granules and then they are mechanically mixed, and the like are applicable.

Next, one embodiment of the third aspect of the present invention will now be described.

First, ferrite granules having an average particle size of from 30 to 300 $\mu$m are produced by mixing raw ferrite powders and an ethylene-modified polyvinyl alcohol whose ethylene modified amount is from 4 to 10 mol %, whose average molecular weight is from 500 to 1700, and whose average saponification degree is from 90.0 to 99.5 mol, and any optional components, granulating the mixture by a spray dryer or oscillating extruding.

Subsequently, the sorbitan higher aliphatic acid ester having an HLB value of not more than 14 is added to the ferrite granules in a given proportion to allow the ester into contact with the ferrite granules in any of the processes described above, whereby at least parts of the surfaces of the ferrite granules are covered with the ester. At this time, preference is given to cover the whole surface of each ferrite granule, but it is practically satisfied if at least 10% of the surface area is covered with the sorbitan higher aliphatic acid ester. When parts of sorbitan higher acid ester is penetrated into the ferrite granules, but it does not have any problem.

As described above, when at least surfaces of the ferrite granules obtained by mixing the raw ferrite powders, an ethylene-modified polyvinyl alcohol whose ethylene modified amount is from 4 to 10 mol %, whose average molecular weight is from 500 to 1700, and whose average saponification degree is from 90.0 to 99.5 mol, and any optional, followed by granulation are covered with the sorbitan higher aliphatic acid ester, ferrite granules can possess an excellent crushing property at a low pressure in the molding, improve lubricity, flowability and a pressure-transmitting property and are a good packing property into a mold.

Subsequently, in order to mold the ferrite granules containing a prescribed ethylene-modified polyvinyl alcohol, at least part of the surfaces of which are covered with the sorbitan higher aliphatic acid ester, to obtain a ferrite green body, the ferrite granules, whose surfaces have been covered as described above, are molded into a prescribed shape by a normal molding process. Particularly, in the molding process, the ferrite granules are molded in a mold in a dry pressure molding process. The molding pressure in this case is usually from 40 to 500 Mpa, and preferably from 80 to 400 MPa.

In the ferrite green body obtained as described above, the decreasing of the strength of the green body can also be suppressed, and product defective such as cracking and breaking can be suppressed. As a result, a ferrite green body can be produced in a low pressure in comparison with the prior art, and with low unevenness.

Also, the ferrite granules used in this case, which have a good mold releasing property, have merits that the pressure for releasing a green body at the time of releasing the ferrite green body can be low, and the abrasion and injuring of the mold can be suppressed. In addition, these effects make it possible to decrease the spring back at the time of taking out the green body.

EXAMPLES

The present invention will now be described further detail by referring to the working examples and the comparative examples.

Examples 1 to 8 and Comparative Examples 1 to 8
[Granulation]

Ferrite slurries were prepared by wet-mixing 67 parts by weight of Ni—Cu—Zn ferrite powder as the raw ferrite powder, 33 parts by weight of water, 6 parts by weight of an aqueous 12 wt % solution of ethylene-modified polyethylene shown in Table 1, 0.25 parts by weight of ammonium polycarbonate as a dispersant, an amount of polyethylene glycol as shown in Table 1, and an amount of a water dispersible wax shown in Table 1.

Each of the resulting ferrite slurries was spray-dried in a spray dryer under the granulation conditions shown in Table 1 to obtain globular ferrite granules having an average particle diameter of 90 μm. At this time, a disc type atomizer having a 100 mm diameter disk was used to perform granulation at an atomizer revolution speed of 7,000 rpm.

[Measurement of Flowability]

The flowability of the resulting ferrite granules was evaluated by measuring a time required for dropping 50 g of the ferrite granules through a funnel defined according to JIS Z2502 (sec./50 g). The results of the measurement are shown in Table 2.

The ferrite granules obtained in Examples 1 to 8 were found to have good flowability (18–24 sec/50 g). In contrast, the ferrite granules obtained in Comparative Examples 2, 6, and 8 had poor flowability. This can be assumed that in these Comparative Example, due to low inlet and outlet temperatures during the granulation, the moisture could not sufficiently be evaporated from the ferrite granules. For this reason, it can also be deduced that the cohesive property between the ferrite granules is heightened and, thus, the flowability becomes poor.

[Molding of Ferrite Granules]

Subsequently, the ferrite granules obtained from Examples and Comparative Examples were dry molded under a pressure of 98 MPa to obtain a rectangular parallelepiped block having 55 mm in length, 12 mm in width, and 5 mm in height. The deflective strength of the rectangular parallelepiped block was measured according to JIS R1601 using a load tester (available from AIKO Engineering Co., Ltd.). The results are shown in Table 2 as the deflective strength 1.

The deflective strength 1 is a measurement for the mechanical strength of the ferrite green body, and indicates that higher the value is, higher the mechanical strength of the ferrite green body.

The ferrite green body blocks obtained from Examples were found to have good deflective strengths. In contrast, as for the ferrite green body obtained from Comparative Examples, except for Comparative Example 3, their deflective strengths were clearly poorer than those obtained from Examples 1 to 8. Since the deflective strength has a closely relationship with the amount of the granule boundary within the ferrite green body, the deflective strength becomes lower unless the problem concerning the granule boundary is sufficiently solved. For this reason, it can be indicated that almost all of Comparative Examples could not solve the problem concerning the granule boundary,

[Sintering of Green Body]

The ferrite granules obtained by Examples and Comparative Examples were dry molded under a pressure of 98 MPa to obtain a rectangular parallelepiped block having 55 mm in length, 12 mm in width, and 5 mm in height. The resulting green body blocks were sintered at a temperature of 1050° C. over a period of 2 hours to thereby obtain ferrite sintered body blocks. The deflective strength of the ferrite sintered body block was measured according to JIS R1601 using a load tester (available from AIKO Engineering Co., Ltd.). The results are shown in Table 2 as the deflective strength 2.

The deflective strength 2 is a measurement for the mechanical strength of the ferrite sintered body, and indicates that higher the value is, higher the mechanical strength of the ferrite sintered body.

The ferrite sintered body blocks obtained from Examples 1 to 8 had good deflective strength on average. Although the ferrite sintered body blocks obtained from some of Comparative Examples showed deflective strength higher than those from Examples 1 to 8, those from almost all of Comparative Examples had poorer deflective strength.

TABLE 1

| | Ethylene Modified PVA | | | | Spray Dryer | | PEG | | Water |
| | Addition Amount (parts by wt) | CH2CH2 Modified Amount (mol %) | Polym. Degree | Sapo. Degree (mol %) | Inlet Temp. (° C) | Outlet Temp. (° C) | Molecular Weight | Addition Amount (parts by WT) | Dispersible Wax (Parts by WT) |
|---|---|---|---|---|---|---|---|---|---|
| EX1 | 1.0 | 5 | 1700 | 98.5 | 200 | 90 | 2000 | 0.2 | 0.3 |
| EX 2 | 1.0 | 5 | 1300 | 93 | 190 | 85 | 2000 | 0.2 | 0.3 |
| EX 3 | 1.0 | 8 | 500 | 98 | 190 | 80 | 2000 | 0.2 | 0.3 |

TABLE 1-continued

| | Ethylene Modified PVA | | | | Spray Dryer | | PEG | | Water |
|---|---|---|---|---|---|---|---|---|---|
| | Addition Amount (parts by wt) | CH2CH2 Modified Amount (mol %) | Polym. Degree | Sapo. Degree (mol %) | Inlet Temp. (° C) | Outlet Temp. (° C) | Molecular Weight | Addition Amount (parts by WT) | Dispersible Wax (Parts by WT |
| EX 4 | 1.0 | 7 | 1100 | 94 | 170 | 65 | 4000 | 0.2 | 0.3 |
| EX 5 | 1.0 | 5 | 1300 | 93 | 230 | 125 | 4000 | 0.2 | 0.3 |
| EX 6 | 1.0 | 5 | 500 | 98.5 | 190 | 85 | 2000 | 0.2 | 0.3 |
| EX 7 | 1.0 | 5 | 1700 | 98.5 | 200 | 100 | 2000 | 0.2 | 0.3 |
| EX 8 | 1.0 | 6 | 500 | 92 | 200 | 100 | 2000 | 0.2 | 0.3 |
| Comp. EX1 | 1.0 | 7 | 1100 | 94 | 280 | 150 | 2000 | 0.2 | 0.3 |
| Comp. EX2 | 1.0 | 7 | 1100 | 94 | 150 | 60 | 2000 | 0.2 | 0.3 |
| Comp. EX3 | 1.0 | 0 | 1700 | 98.5 | 200 | 90 | 2000 | 0.2 | 0.3 |
| Comp. EX4 | 1.0 | 0 | 1700 | 98.5 | 280 | 150 | — | 0 | 0.3 |
| Comp. EX5 | 1.0 | 0 | 2400 | 98.5 | 260 | 140 | — | 0 | 0 |
| Comp. EX6 | 1.0 | 0 | 500 | 81 | 160 | 60 | 2000 | 0.2 | 0 |
| Comp. EX7 | 1.0 | 0 | 1700 | 98.5 | 260 | 100 | 10000 | 0.2 | 0 |
| Comp. EX8 | 1.0 | 0 | 500 | 88 | 160 | 60 | 600 | 0.2 | 0 |

TABLE 2

| | Flowability (sec/50 g) | Water-Content (wt %) | Density of Green body (g/cm³) | Deflective Strength 1 (MPa) | Deflective Strength 2 (MPa) |
|---|---|---|---|---|---|
| Example 1 | 20 | 0.3 | 3.14 | 1.6 | 45 |
| Example 2 | 21 | 0.4 | 3.20 | 1.5 | 46 |
| Example 3 | 21 | 0.4 | 3.24 | 1.4 | 50 |
| Example 4 | 23 | 0.5 | 3.22 | 1.6 | 44 |
| Example 5 | 19 | 0.3 | 3.13 | 1.3 | 42 |
| Example 6 | 20 | 0.3 | 3.07 | 1.1 | 35 |
| Example 7 | 21 | 0.3 | 3.09 | 1.1 | 36 |
| Example 8 | 23 | 0.3 | 3.24 | 1.0 | 40 |
| Comp. 1 | 20 | 0.1 | 2.98 | 0.6 | 28 |
| Comp. 2 | 28 | 1.1 | 3.25 | 0.2 | 45 |
| Comp. 3 | 20 | 0.3 | 3.02 | 1.0 | 29 |
| Comp. 4 | 22 | 0.1 | 2.84 | 0.3 | 22 |
| Comp. 5 | 22 | 0.1 | 2.78 | 0.2 | 19 |
| Comp. 6 | 30 | 1.2 | 3.19 | 0.2 | 37 |
| Comp. 7 | 22 | 0.1 | 2.77 | 0.2 | 17 |
| Comp. 8 | 32 | 1.4 | 3.15 | 0.2 | 38 |

[Relation Between molding Pressure and Density of Green Body]

Subsequently, 1.5 g of each of ferrite granules obtained from each of Examples and Comparative Examples were packed into a mold having 6 mm in diameter, and dry molded varying the molding pressure from 49 to 294 MPa to produce cylindrical ferrite green bodies having 6 mm in diameter and 16 to 19 mm in length. These samples were used to evaluate the relation between the molding pressure and the density of the green body. The results of the density of the green bodies at the molding pressure of 98 MPa are shown in Table 2. Also, the relation between the molding pressure and the density of the green body in Examples 1 and 4 and Comparative Examples 1 and 4 are shown in FIG. 1.

According to Table 2, the cylindrical ferrite green bodies obtained from Examples 1 to 8 had high densities of the green bodies on average. In contrast, with regard to the cylindrical green bodies obtained in Comparative Examples, although some of them had higher densities of the green bodies than those of Examples 1 to 8, almost all of them had lower densities of the green bodies than those of Examples.

Figure 1:
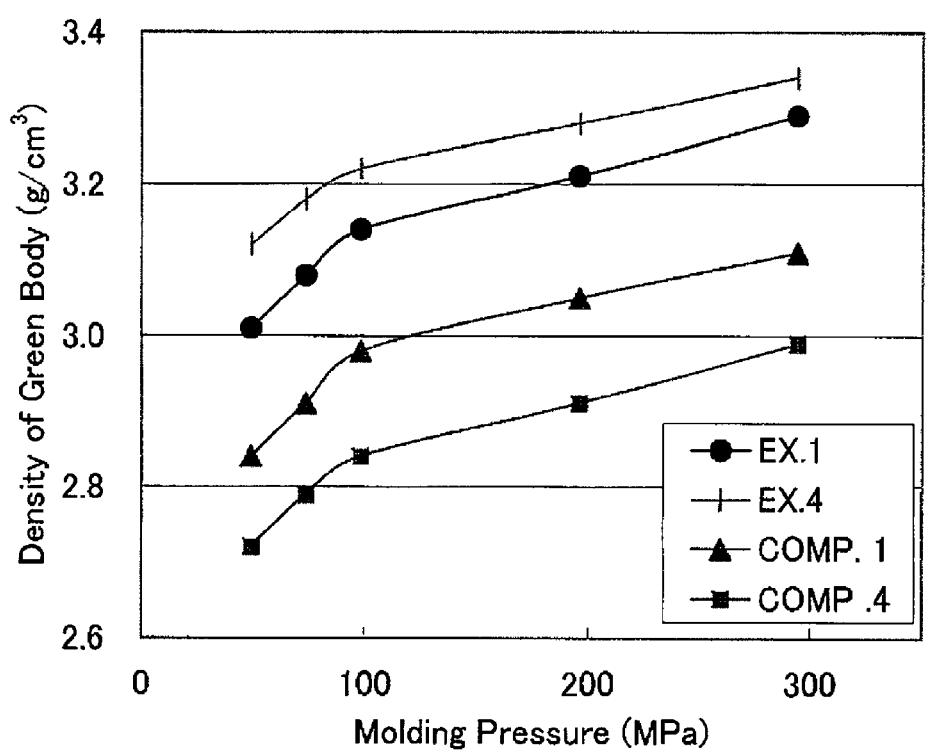
FIG. 1 is a graph showing the relation between the molding pressure and the density of the green body in Examples according to the first aspect of the present invention and Comparative Examples.

According to FIG. 1, irrevrent to Examples and Comparative Examples, the density of the ferrite green body is sharply increased with increasing of the molding pressure up to approximately 100 MPa. When the molding pressure exceeds 100 MPa, the increasing of the density of the ferrite green body becomes moderate. Considering these four graphs have almost parallel changes, it can be deduced that they are not reversed even if the molding pressure is further increased.

[Photos of Side Surfaces]

The ferrite granules obtained from Example 1 and Comparative Examples 4 (each 1.5 g) were packed in a mold having a diameter of 6 mm, and molded at a molding pressure of 147 MPa to produce cylindrical ferrite green bodies having 6 mm in diameter and length in from 16 to 19 mm FIG. 2 shows the results of the observation where the situations of the granules were observed by a scanning electron microscope (SEM). FIGS. 2A, 2B and 2C each shows sides of an upper portion, a middle portion and a lower portion of the ferrite granule obtained under the conditions of Example 1, while FIGS. 2D, 2E and 2F each shows sides of an upper portion, a middle portion and a lower portion of the ferrite granule obtained under the conditions of Comparative Example 4.

The terms "upper portion", "middle portion" and "lower portion" of the ferrite granule intended herein mean relative distances from the pushing means for pushing the mold, where the upper portion indicates the side of the ferrite green body near the pushing means, the lower portion indicates the side of the ferrite green body farthest from the pushing means, and the middle portion indicates the side of the ferrite green body near the middle portion between the upper and the lower portions.

It can be confirmed from FIGS. 2A, 2B and 2C that the granule boundaries of the ferrite granule are very small on all of portions in the Example 1 so that they can be evaluated only with difficulty. In contrast, in Comparative Example 4 (FIGS. 2D, 2E, and 2F), the granule boundaries of the ferrite granule can be proven to be very large and to be different from each other depending upon the observation portions. This shows that the crushing property at a low pressure is poorer than that in Example 1 and that the pressure transmitting property is worse and, thus, the molding pressure could not be uniformly transmitted to the lower portion.

From the results of Table 2 and FIG. 2, the ferrite green bodies produced from the ferrite granules obtained from Examples 1 to 8 in which the ethylene modified vinyl alcohol having the above properties was used to perform the granulation under the granulation conditions defined in the present invention had improved crushing properties at a low pressure, and decreased granule boundary of the ferrite green body, and could produce sintered bodies with decreased internal defects, significantly improving the strength, i.e., satisfied results could be obtained.

In contrast, the ferrite green bodies obtained from Comparative Examples 2, 6 and 8 in which the granulation was carried out at a temperature lower than the temperature condition defined in the present invention had poor crushing property, remained much more granule boundaries, and was not well dried. Also, these ferrite green bodies had high water contents and, thus, had poorer flowability. In addition, the strength of the ferrite green body was very low.

[Evaluation of Continuous Moldability]

Ferrite green bodies were continuously produced using the ferrite granules obtained from Examples and Comparative Examples. The ferrite green body thus molded had a cylindrical core shape measuring 1.5 mm in diameter, 1.8 mm in length, and 1000 of the green bodies were continuously produced from each granule. The resulting ferrite green bodies were sintered at a temperature of 1050° C. for 2 hours to thereby obtain ferrite sintered bodies. The evolution results are shown in Table 3. The evaluation criteria for cracking, sticking and chipping are given in Table 4.

TABLE 3

|  | Ferrite Green Body | | Ferrite Sintered Body | |
| --- | --- | --- | --- | --- |
|  | Cracking | Sticking | Cracking | Chipping |
| Example 1 | ○ | ○ | ○ | ○ |
| Example 2 | ○ | ○ | ○ | ○ |
| Example 3 | ○ | ○ | ○ | ○ |
| Example 4 | ○ | ○ | ○ | ○ |
| Example 5 | ○ | ○ | ○ | ○ |
| Example 6 | Δ | ○ | Δ | Δ |
| Example 7 | Δ | ○ | Δ | Δ |
| Example 8 | Δ | Δ | Δ | Δ |
| Comp. 1 | ▲ | ○ | ▲ | ▲ |
| Comp. 2 | Δ | ▲ | Δ | ▲ |
| Comp. 3 | ▲ | ○ | ▲ | ▲ |
| Comp. 4 | ▲ | ○ | ▲ | ▲ |
| Comp. 5 | ▲ | ○ | ▲ | ▲ |
| Comp. 6 | ▲ | ▲ | ▲ | ▲ |
| Comp. 7 | ▲ | ○ | ▲ | ▲ |
| Comp. 8 | ▲ | ▲ | ▲ | ▲ |

TABLE 4

|  | Cracking | Sticking | Chipping |
| --- | --- | --- | --- |
| ○ | 0–5 | Not Generated | 0–5 |
| Δ | 6–20 | Generated at 5000 moldings | 6–20 |
| ▲ | 21–50 | Generated at 1000 moldings | 21–50 |

It can be seen from the results given in Table 3 that no sticking occurred in the ferrite green bodies produced from ferrite granules of Examples 1 to 8 in which the ethylene modified vinyl alcohol having the above properties, and the frequency of generating cracking is low, indicating the satisfied results can be obtained. The ferrite sintered bodies obtained by sintering the ferrite granules of Examples 1 to 8 had little cracking and chipping, indicating good results.

In contrast, in the ferrite green bodies produced from the ferrite granules of Comparative Examples 1, 4, 5 and 7 in which the granulation was carried out at a temperature higher than the temperature condition defined in the present invention, many granule boundaries were found, indicating significant frequency of generating cracking. In the ferrite green bodies produced by sintering the ferrite granules of Comparative Examples 1, 4, 5 and 7, cracking and chipping significantly occurred.

In using the ferrite granules of Comparative Examples 2, 6 and 8 in which the granulation was carried out at a temperature lower than the temperature condition defined in the present invention, sticking frequently occurred so that continuous molding could not be performed. Also, in the ferrite sintered bodies obtained from Comparative Examples 2, 6 and 8, cracking and chipping significantly occurred.

In using the ferrite granules according to Comparative Example 3 in which the granulation temperature conditions were satisfied in the conditions defined in the present invention, but polyvinyl alcohol not modified with ethylene was used, no sticking was generated during the course of the continuous molding, but cracking could be significantly found in the ferrite green body.

Examples 9 to 24 and Comparative Examples 9 to 18

[Preparation of Granulating Materials]

The types and amounts of the raw ferrite materials, water, and binder components, and other materials including plasticizers and lubricants are given in Table 5.

TABLE 5

| Raw Material No. | Raw Ferrite Powder Amount | Water Amount | Modified PVA Concentation (Wt %) | Polymerization Degree | Saponification Degree (mole %) | Modified Amount (Mole %) | Amount | Plasticizer PEG Mole. Weight | Plasticizer PEG Amount | Water-Dispersible Wax Amount |
|---|---|---|---|---|---|---|---|---|---|---|
| 1 | 69 | 25 | 12 | 1300 | 93 | 5 | 6 | 2000 | 0.2 | 0.3 |
| 2 | 69 | 25 | 12 | 1700 | 95 | 5 | 6 | 2000 | 0.2 | 0.3 |
| 3 | 69 | 25 | 12 | 1100 | 94 | 7 | 6 | 2000 | 0.2 | 0.3 |
| 4 | 69 | 25 | 12 | 500 | 96.5 | 5 | 6 | 2000 | 0.2 | 0.3 |
| 5 | 69 | 25 | 12 | 500 | 95 | 5 | 6 | 4000 | 0.2 | 0.3 |
| 6 | 69 | 25 | 12 | 1700 | 96.5 | 5 | 6 | 2000 | 0.2 | 0.3 |
| 7 | 100 | 0 | 6 | 1700 | 95 | 4 | 17 | 2000 | 0.2 | 0.3 |
| 8 | 100 | 0 | 6 | 500 | 95 | 8 | 17 | 2000 | 0.2 | 0.3 |
| 9 | 69 | 25 | 12 | 1700 | 96.5 | 0 | 6 | 2000 | 0.2 | 0.3 |
| 10 | 69 | 25 | 12 | 1700 | 88 | 0 | 6 | 4000 | 0.2 | 0 |
| 11 | 69 | 25 | 12 | 500 | 88 | 0 | 6 | — | 0 | 0.3 |
| 12 | 100 | 0 | 6 | 1700 | 98.5 | 0 | 17 | 2000 | 0.2 | 0.3 |
| 13 | 100 | 0 | 6 | 500 | 88 | 0 | 17 | — | 0 | 0 |

Note) In Table 5, the unit of the addition amount is parts by weight.

[Granulation 1: Examples 9–14 and Comparative Examples 9–11]

The raw material Nos. 1–6 shown in Table 5 were used in Examples 9 to 14, and the raw material Nos. 9–11 were used in Comparative Examples 9 to 11, respectively.

Although not shown in Table 5, the raw ferrite powder used in Examples 9 to 14 and Comparative Examples 9 to 11 comprised Mn—Mg—Zn ferrite.

In these Examples and Comparative Examples, 0.25 parts by weight of ammonium polycarbonate were added as a dispersant in addition to the components shown in Table 5.

The raw ferrite powder, water, the binder component, the plasticizer, the lubricant and the dispersant were wet mixed to prepare ferrite slurry. The resulting ferrite slurry was spray dried in a spray drier to obtain spherical ferrite granules having average particle size of 125 μm, and a moisture content of 0.2% by weight. At this time, a disc type atomizer having a 100 mm diameter disk was used to perform granulation at an atomizer revolution speed of 6,000 rpm.

[Granulation 2: Examples 15–16 and Comparative Examples 12–13]

In Examples 15 and 16, the raw material nos. 7 and 8 shown in Table 5 were used and in Comparative Examples 12 and 13, the raw material nos. 12 and 13 shown in Table 5 were used, respectively.

Although not shown in Table 5, the raw ferrite powder used in Examples 15 and 16 and Comparative Examples 12 and 13 comprised Mn—Mg—Zn ferrite.

The raw ferrite powder, water, the binder component, the plasticizer, the lubricant and the dispersant were mixed, stirred, and granulated in a stirring granulation TM mixer (produced by Mitsui Mining Corp.) to produce granulated powders.

The resulting granulated powders were dried on a belt type drier, and the granulated powders were subjected to oscillation extrusion granulation in an oscillating disintegrator (produced by Nippon Seiki Corp.), followed by screening in a shifter to give ferrite granules having an average particle size of 200 μm and a moisture content of 1.0% by weight.

[Granulation 3: Examples 17–22 and Comparative Examples 14–16]

The raw material Nos. 1–6 shown in Table 5 were used in Examples 17 to 22, and the raw material Nos. 9–11 were used in Comparative Examples 14 to 16, respectively.

Although not shown in Table 5, the raw ferrite powder used in Examples 9 to 14 and Comparative Examples 9 to 11 comprised Mn—Zn ferrite.

In these Examples and Comparative Examples, 0.25 parts by weight of ammonium polycarbonate were added as a dispersant in addition to the components shown in Table 5.

The raw ferrite powder, water, the binder component, the plasticizer, the lubricant and the dispersant were wet mixed to prepare ferrite slurry. The resulting ferrite slurry was spray dried in a spray drier to obtain spherical ferrite granules having average particle size of 100 μm, and a moisture content of 0.2% by weight. At this time, a disc type atomizer having a 100 mm diameter disk was used to perform granulation at an atomizer revolution speed of 6,500 rpm.

[Granulation 4: Examples 23–24 and Comparative Examples 17–18]

In Examples 23 and 24, the raw material nos. 7 and 8 shown in Table 5 were used and in Comparative Examples 12 and 13, the raw material nos. 12 and 13 shown in Table 5 were used, respectively.

Although not shown in Table 5, the raw ferrite powder used in Examples 15 and 16 and Comparative Examples 12 and 13 comprised Mn—Zn ferrite.

The raw ferrite powder, water, the binder component, the plasticizer, the lubricant and the dispersant were mixed, stirred, and granulated in a stirring granulation TM mixer (produced by Mitsui Mining Corp.) to produce granulated powders.

The resulting granulated powders were dried on a belt type drier, and the granulated powders were subjected to oscillation extrusion granulation in an oscillating disintegrator (produced by Nippon Seiki Corp.), followed by screening in a shifter to give ferrite granules having an average particle size of 200 μm and a moisture content of 1.0% by weight.

[Measurement of Flowability]

The flowability of the resulting ferrite granules was evaluated by measuring a time required for dropping 50 g of the ferrite granules through a funnel defined according to JIS Z2502 (sec./50 g). The results of the measurement are shown in Table 2. Table 6 shows the results of measuring the granules in Examples 9–16 and Comparative Examples 9–13, and Table 7 shows the results of measuring the granules in Examples 17–24 and Comparative Examples 14–18

All of these Examples and Comparative Examples except for Comparative Examples were found to good flowability (Spray Drying: 18–24 sec/50 g, Oscillating Extrusion: 20–34 sec/50 g).

[Molding of Ferrite Granules]

Subsequently, the ferrite granules obtained from Examples and Comparative Examples were dry molded under a pressure of 98 MPa to obtain a rectangular parallelepiped block having 55 mm in length, 12 mm in width, and 5 mm in height. The deflective strength of the rectangular parallelepiped block was measured according to JIS R1601 using a load tester (available from AIKO Engineering Co., Ltd.). The results are shown in Table 6 for Examples 9 to 16 and Comparative Examples 9 to 13 and Table 7 for Examples 17 to 24 and Comparative Examples 14 to 18.

The deflective strength is a measurement for the mechanical strength of the ferrite green body, and indicates that higher the value is, higher the mechanical strength of the ferrite green body.

The deflective strengths of ferrite green body blocks obtained from Examples 9 to 16 were found to distribute in the range of from 1.5 to 1.9 MPa, which were clearly better than those from Comparative Examples 9 to 18.

[Relation Between Molding Pressure and Density of Green Body]

Subsequently, 1.5 g of each of ferrite granules obtained from each of Examples and Comparative Examples were packed into a mold having 6 mm in diameter, and dry molded varying the molding pressure from 49 to 294 MPa to produce cylindrical ferrite green bodies having 6 mm in diameter and 16 to 19 mm in length. These samples were used to evaluate the relation between the molding pressure and the density of the green body. The results of the density of the green bodies at the molding pressure of 98 MPa are shown in Tables 6 and 7.

According to Tables 6 and 7, the cylindrical ferrite green bodies obtained from Examples 9 to 24 had densities of the green bodies clearly higher than those from Comparative Examples 9 to 18. This can be deduced that the ferrite green bodies obtained from Examples 9 to 24 each had an adhering property among the ferrite granules to thereby possess small granule boundary so that the density of the green body became high.

Figure 4:
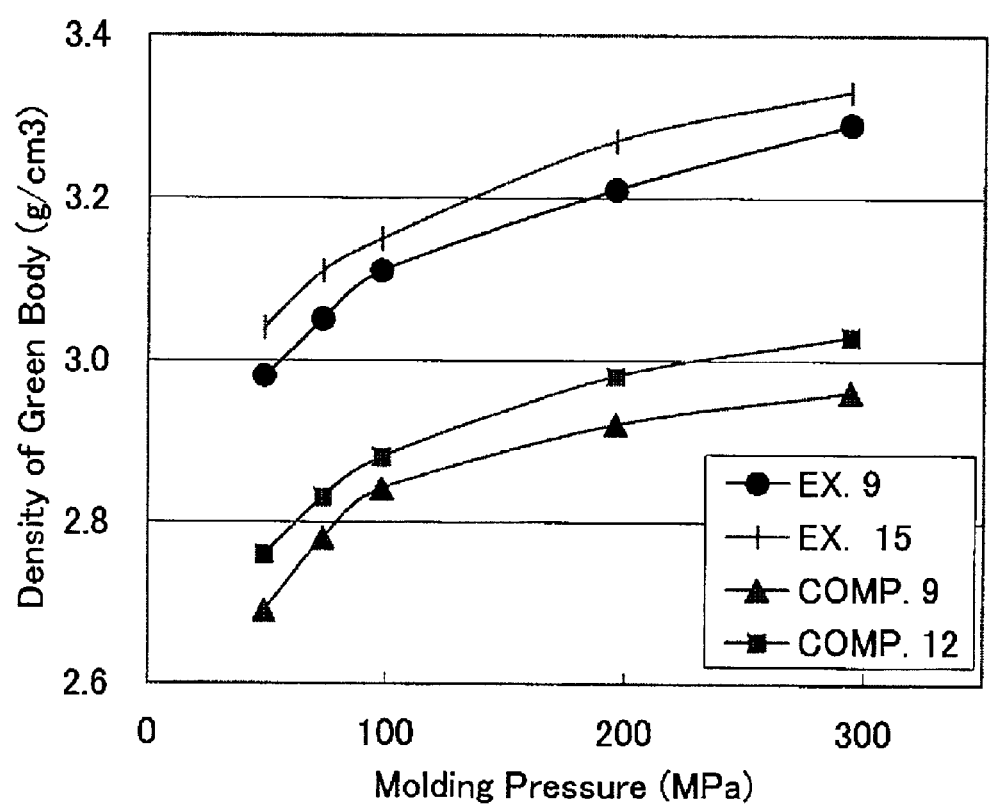
FIG. 4 and FIG. 5 each shows a relation between the molding pressure and the density of the green body according to the first aspect of the present invention.
Figure 5:
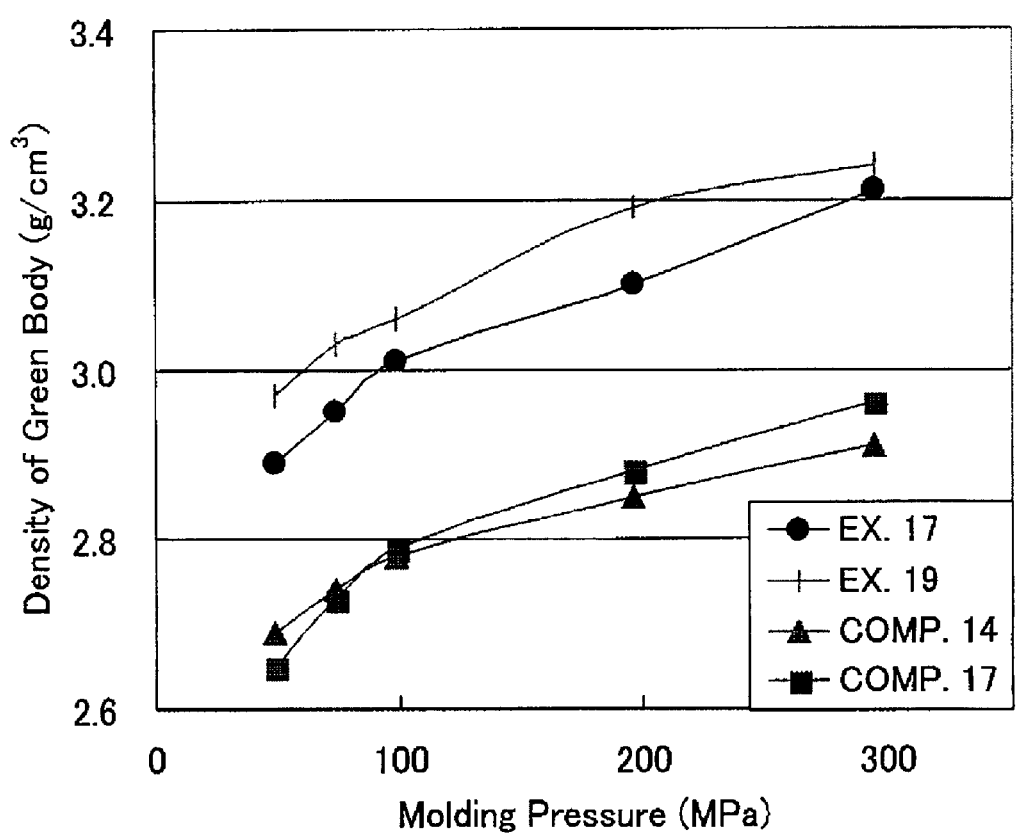

The relation between the molding pressure and the density of the green body are shown in FIG. 4 for Examples 9 and 15 and Comparative Examples 9 and 12 and shown in FIG. 5 for Examples 17 and 23 and Comparative Examples 14 and 17.

According to FIG. 4, Examples 9 and 15 showed higher densities of the green body than those of Comparative Examples 9 and 12 over the whole molding pressure range. Irrelevent to Examples and Comparative Examples, when the molding pressure exceeds 100 MPa, the increasing of the density of the ferrite green body becomes moderate. Considering these four graphs have almost parallel changes, it can be deduced that they are not reversed even if the molding pressure is further increased.

According to FIG. 5, Examples 17 and 23 showed higher densities of the green body than those of Comparative Examples 14 and 17 over the whole molding pressure range.

[Photos of Side Surfaces]

Figure 6A:
FIGS. 6 and 7 each shows the results of the observation where the situations of the granules were observed by a scanning electron microscope (SEM) according to the first aspect of the present invention.
Figure 6B:
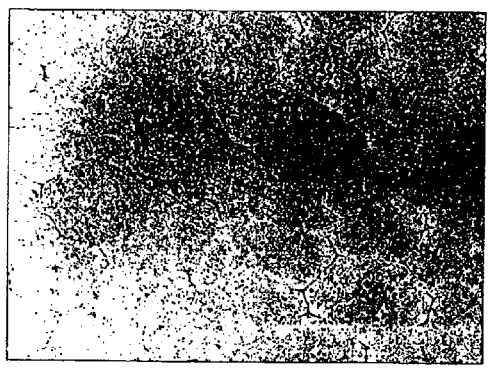
Figure 6C:
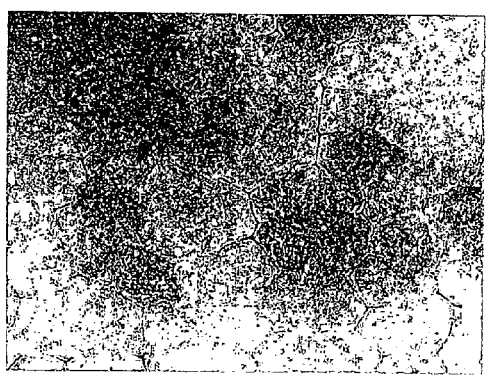
Figure 6D:
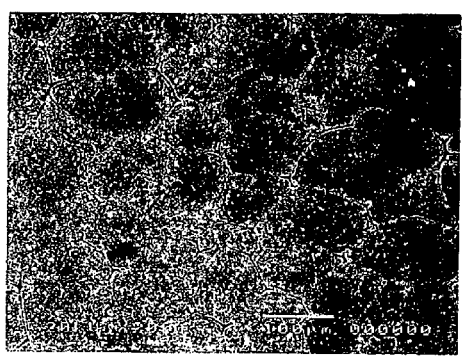
Figure 6E:
Figure 6F:
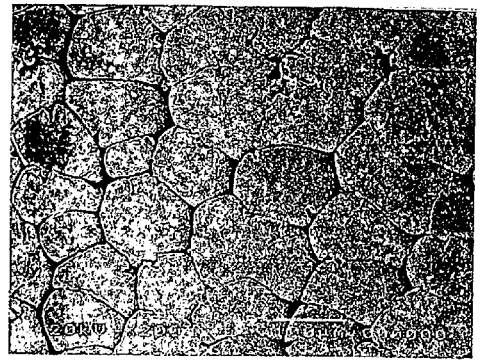
Figure 7G:
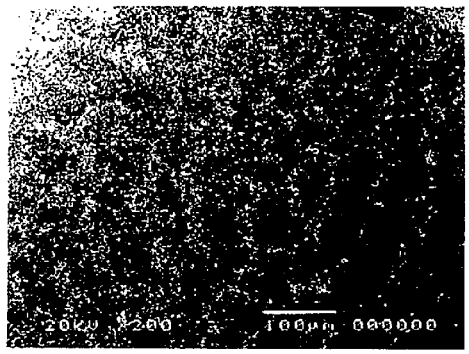
Figure 7J:
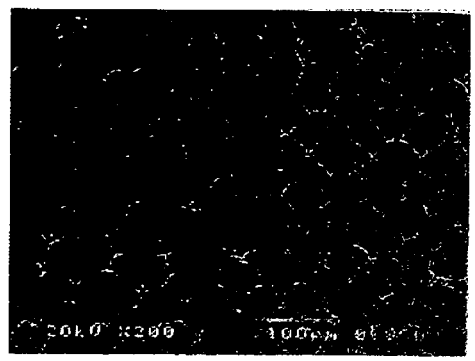
Figure 7H:
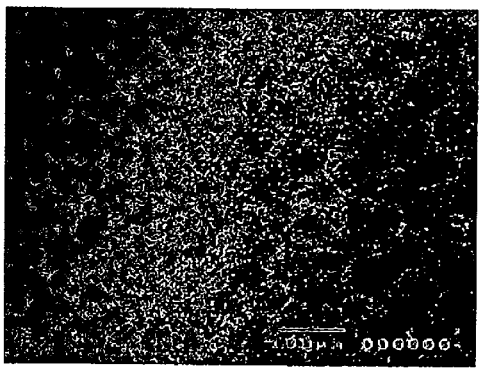
Figure 7K:
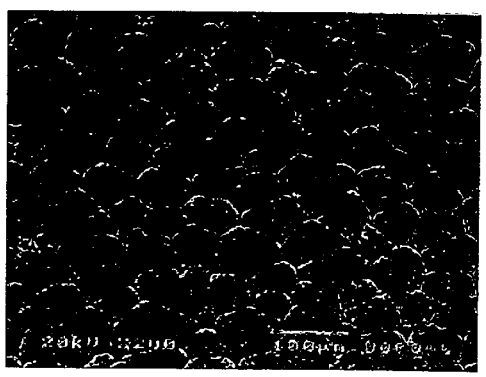
Figure 7I:
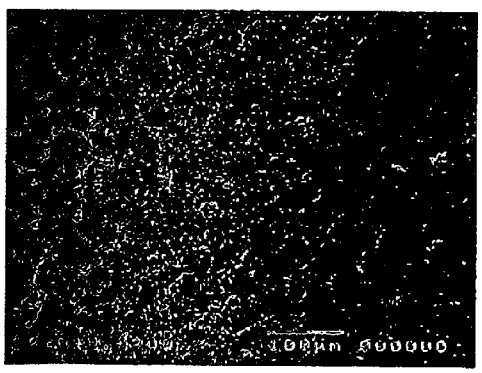
Figure 7L:
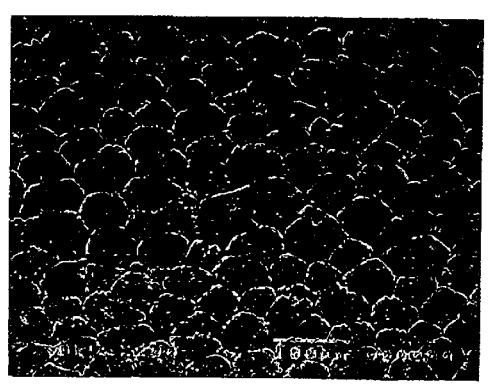

The ferrite granules obtained from Example 9 and Comparative Examples 9 (each 1.5 g) were packed in a mold having a diameter of 6 mm, and molded at a molding pressure of 147 MPa to produce cylindrical ferrite green bodies having 6 mm in diameter and length in from 16 to 19 mm. FIG. 6 shows the results of the observation where the situations of the granules were observed by a scanning electron microscope (SEM). FIGS. 6A, 6B and 6C each shows sides of an upper portion, a middle portion and a lower portion of the ferrite granule obtained under the conditions of Example 9, while FIGS. 6D, 6E and 6F each shows sides of an upper portion, a middle portion and a lower portion of the ferrite granule obtained under the conditions of Comparative Example 9.

Similarly, FIG. 7 shows the results of the observation where the crushing situations of the ferrite granules of the ferrite green bodies from Example 17 and Comparative Example 14 granulated at a molding pressure of 147 MPa were observed by SEM. FIGS. 7G, 7H and 7I each shows sides of an upper portion, a middle portion and a lower portion of the ferrite granule obtained under the conditions of Example 17, while FIGS. 7J, 7K and 7L each shows sides of an upper portion, a middle portion and a lower portion of the ferrite granule obtained under the conditions of Comparative Example 14.

The terms "upper portion", "middle portion" and "lower portion" of the ferrite granule intended herein mean relative distances from the pushing means for pushing the mold, where the upper portion indicates the side of the ferrite green body near the pushing means, the lower portion indicates the side of the ferrite green body farthest from the pushing means, and the middle portion indicates the side of the ferrite green body near the middle portion between the upper and the lower portions.

It can be confirmed from FIGS. 6A, 6B and 6C and FIGS. 7G, 7H and 7I that the granule boundaries of the ferrite granule are very small on all of portions in the Examples 9 and 17. In contrast, in Comparative Examples 9 and 14 (FIGS. 6D, 6E, and 6F and FIGS. 7J, 7K and 7L), the granule boundaries of the ferrite granule can be proven to be very large and to be different from each other depending upon the observation portions. This shows that the crushing properties at a low pressure in Comparative Examples 9 and 17 are poorer than those in Example 9 and 17 and that the pressure transmitting properties in these Comparative Examples are worse and, thus, the molding pressure could not be uniformly transmitted to the lower portion.

[Sintering of Green Body 1]

Ferrite green body rings each having 21 mm in an external diameter, 12 mm in an inner diameter and 7 mm in a thickness were produced by dry molding ferrite granules obtained in Examples 9 to 16 and Comparative Examples 9 to 13 while adjusting the molding pressure at approximately 98 MPa. Subsequently, they were sintered at 1300° C. for 2 hours to produce ring cores.

[Measurement of Magnet Loss 1]

The magnet loss, Pcv, of each resulting ring core was measured by a B-H analyzer (produced from Iwatsu Electric Co. Ltd. and marketed under the trade name of SY-8216) under the conditions of 64 kHz, 50 mT, and 100° C. The results are shown in Table 6.

[Sintering of Green Body 2]

Ferrite green body rings each having 31 mm in an external diameter, 19 mm in an inner diameter and 8 mm in a thickness were produced by dry molding ferrite granules obtained in Examples 17 to 23 and Comparative Examples 14 to 18 while adjusting the molding pressure at approximately 98 MPa. Subsequently, they were sintered at 1300° C. for 5 hours under an oxygen partial pressure controlled atmosphere to produce ring cores.

[Measurement of Magnet Loss 2]

The magnet loss, Pcv, of each resulting ring core was measured by a B-H analyzer (produced from Iwatsu Electric Co. Ltd. and marketed under the trade name of SY-8216) under the conditions of 100 kHz, 200 mT, and 75° C. The results are shown in Table 7.

TABLE 6

| | Raw Material No. | Granulation | Flowability (Sec/50 g) | Density of Green Body (g/cm³) | Deflective Strength (MPa) | Water Absorbency (Wt %) | Magnet Loss (kW/m³) |
|---|---|---|---|---|---|---|---|
| Example 9 | 1 | Spray Drying | 22 | 3.11 | 1.8 | 0.06 | 68 |
| Example 10 | 2 | Spray Drying | 21 | 3.08 | 1.9 | 0.08 | 69 |
| Example 11 | 3 | Spray Drying | 22 | 3.13 | 1.8 | 0.04 | 65 |
| Example 12 | 4 | Spray Drying | 21 | 3.07 | 1.7 | 0.09 | 69 |
| Example 13 | 5 | Spray Drying | 22 | 3.16 | 1.8 | 0.03 | 63 |
| Example 14 | 6 | Spray Drying | 22 | 3.01 | 1.6 | 0.16 | 74 |
| Example 15 | 7 | Oscillating Extrusion | 25 | 3.15 | 1.8 | 0.05 | 67 |
| Example 16 | 8 | Oscillating Extrusion | 26 | 3.18 | 1.7 | 0.02 | 62 |
| Comp. 9 | 9 | Spray Drying | 23 | 2.84 | 1.0 | 0.30 | 91 |
| Comp. 10 | 10 | Spray Drying | 23 | 2.91 | 0.8 | 0.23 | 85 |
| Comp. 11 | 11 | Spray Drying | 24 | 2.94 | 0.5 | 0.12 | 73 |
| Comp. 12 | 12 | Oscillating Extrusion | 26 | 2.88 | 1.1 | 0.25 | 88 |
| Comp. 13 | 13 | Oscillating Extrusion | 29 | 2.97 | 0.7 | 0.11 | 72 |

TABLE 7

| | Raw Material No. | Granulation | Flowability (Sec/50 g) | Density of Green Body (g/cm³) | Deflective Strength (MPa) | Water Absorbency (Wt %) | Magnet Loss (kW/m³) |
|---|---|---|---|---|---|---|---|
| Example 17 | 1 | Spray Drying | 23 | 3.01 | 1.6 | 0.07 | 276 |
| Example 18 | 2 | Spray Drying | 22 | 2.99 | 1.7 | 0.10 | 290 |
| Example 19 | 3 | Spray Drying | 22 | 3.03 | 1.6 | 0.04 | 267 |
| Example 20 | 4 | Spray Drying | 21 | 2.97 | 1.5 | 0.09 | 283 |
| Example 21 | 5 | Spray Drying | 22 | 3.07 | 1.7 | 0.03 | 255 |
| Example 22 | 6 | Spray Drying | 23 | 2.92 | 1.5 | 0.15 | 296 |
| Example 23 | 7 | Oscillating Extrusion | 25 | 3.06 | 1.7 | 0.06 | 270 |
| Example 24 | 8 | Oscillating Extrusion | 27 | 3.08 | 1.5 | 0.02 | 250 |
| Comp. 14 | 9 | Spray Drying | 24 | 2.78 | 1.0 | 0.31 | 340 |
| Comp. 15 | 10 | Spray Drying | 23 | 2.84 | 0.7 | 0.25 | 322 |
| Comp. 16 | 11 | Spray Drying | 25 | 2.86 | 0.4 | 0.18 | 307 |
| Comp. 17 | 12 | Oscillating Extrusion | 27 | 2.79 | 1.1 | 0.23 | 331 |
| Comp. 18 | 13 | Oscillating Extrusion | 29 | 2.88 | 0.6 | 0.12 | 288 |

[Measurement of Water Absorbency]

The water absorbency of each ring core was measured in a method according to JIS C2141. Specifically, the test piece (ring core) was dried at 105–120° C., allowed to cool down to room temperature in a dedicator, and the dry weight of the test piece, $W1$, was measured. Thereafter, the ring core was sunk in water, the water is boiled and allowed to cool down. The moisture on the surface of the ring core was whipped by gauze to give the water-saturated test piece, and the weight thereof, $W2$, was measured. The water absorbency (%) was calculated according to the following formula:

Water Absorbency (%)=$100 \times (W2 - W1)/W1$

The results are given in Tables 6 and 7.

[Relation Between Water Absorbency and Magnet Loss Pcv]

Figure 8:
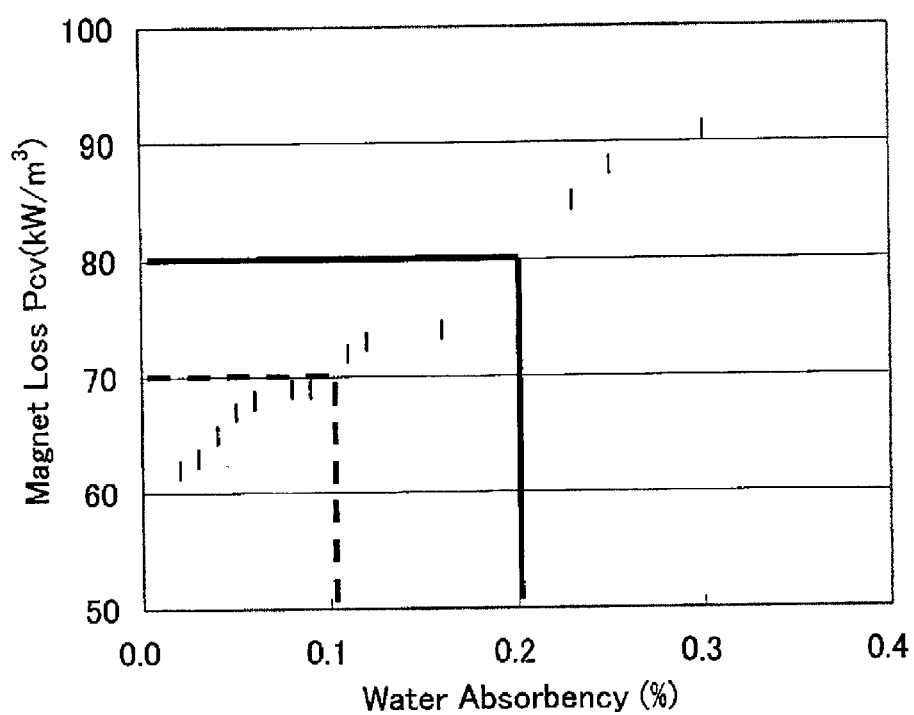
FIGS. 8 and 9 each shows the relation between the water absorbency and the magnet loss as a scattering figure according to Examples of the second aspect of the present invention and Comparative Examples.

FIG. 8 shows the relation between the water absorbency and the magnet loss of Table 6 (Examples 9–16 and Comparative Examples 9–13), Pcv, as a scattering figure. It can be understood that if the water absorbency is not more than 0.2%, a core having a low magnet loss, which is not higher than 80 kW/m$^3$ in the ferrite having the exemplified composition (Mn—Mg—Zn ferrite). Furthermore, it can be understood that in order to obtain a core having a low magnet loss, which is not higher than 70 kW/m$^3$, the absorbency must be not more than 0.1% by weight.

Figure 9:
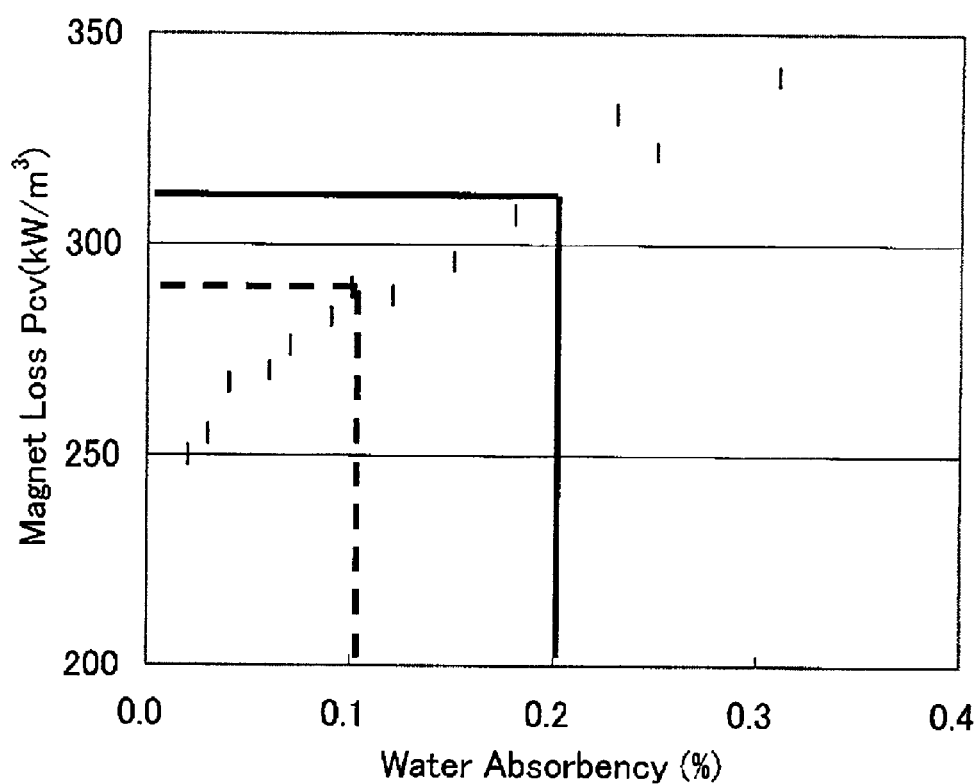

Similarly, FIG. 9 shows the relation between the water absorbency and the magnet loss of Table 7 (Examples 17–24 and Comparative Examples 14–18), Pcv, as a scattering figure. It can be understood that if the water absorbency is not more than 0.2%, a core having a low magnet loss, which is not higher than 310 kW/m$^3$ in the ferrite having the exemplified composition (Mn—Zn ferrite). Furthermore, in order to obtain a core having a low magnet loss, which is not higher than 290 kW/m$^3$, the absorbency is preferably not more than 0.1% by weight.

[Conclusion]

From the results of Tables 6 and 7 and FIGS. 3 to 8, by molding ferrite granules obtainable by adding an ethylene-modified polyvinyl alcohol as a binder component, a ferrite green body having a high density, i.e., low granule boundary, and a high mechanical strength can be obtained. Consequently, cracking and breaking which will easily occur during the course of molding can be significantly decreased. By sintering the ferrite green body, a ferrite sintered body can be obtained, which is compact, has a decreased number of gaps, i.e., low water absorbency. Consequently, due to the decreased defective within the ferrite sintered body, the resulting ferrite sintered body has significantly improved magnet loss.

The third aspect of the present invention will now be described by referring to Examples and Comparative Examples.

Examples 25 to 31 and Comparative Examples 19 to 24

[Preparation of Granulating Materials]

Table 8 shows the amount of the raw ferrite powder, water, the binder component, and others and dispersant for use in the production of ferrite sinter bodies in Examples and Comparative Examples.

[Granulation 1: Examples 25–29 and Comparative Examples 19–22]

The raw material Nos. 1–4 shown in Table 5 were used in Examples 25 to 29, and the raw material Nos. 7 and 8 were used in Comparative Examples 19 and 22, respectively.

Although not shown in Table 8, the raw ferrite powder used in Examples 25 to 29 and Comparative Examples 19 to 22 comprised Ni—Cu—Zn ferrite.

Ferrite slurries were prepared by wet-mixing the raw ferrite powder, water, the binder component, and the dispersant. The resulting ferrite slurries was spray-dried in a spray dryer obtain globular ferrite granules having an average diameter of 100 μm. At this time, a disc type atomizer having a 100 mm diameter disk was used to perform granulation at an atomizer revolution speed of 6,000 rpm.

[Granulation 2: Examples 30–31 and Comparative Examples 23–24]

In Examples 30 and 31, the raw material nos. 5 and 6 shown in Table 8 were used and in Comparative Examples 23 and 24, the raw material nos. 9 and 10 shown in Table 5 were used, respectively.

Although not shown in Table 8, the raw ferrite powder used in Examples 15 and 16 and Comparative Examples 12 and 13 comprised Ni—Cu—Zn ferrite.

The raw ferrite powder, water, the binder component, the plasticizer, the lubricant and the dispersant were mixed, stirred, and granulated in a stirring granulation TM mixer (produced by Mitsui Mining Corp.) to produce granulated powders.

The resulting granulated powders were dried on a belt type drier, and the granulated powders were subjected to oscillation extrusion granulation in an oscillating disintegrator (produced by Nippon Seiki Corp.), followed by screening in a shifter to give ferrite granules having an average particle size of 200 μm and a moisture content of 1.2% by weight.

[Addition of Hexitan Higher Aliphatic Acid Ester]

To each of these ferrite granules was added a hexitan higher acid ester shown in Table 8, the mixture was rotated and mixed in a drum mixer to produce ferrite granules free of aggregated powder.

TABLE 8

| Raw Material No. | Raw Ferrite Powder Amount | Water Amount | Binder Component Aqueous Ethylene Modified PVA Solution | | | | | Dispersant NH4 poly-carbonate Amount |
|---|---|---|---|---|---|---|---|---|
| | | | Modified PVA Concentation (Wt %) | Polymerization Degree | Saponification Degree (mole %) | Modified Amount (Mole %) | Amount | |
| 1 | 67 | 33 | 12 | 1700 | 95 | 4 | 6 | 0.25 |
| 2 | 67 | 33 | 12 | 1300 | 93 | 5 | 6 | 0.25 |
| 3 | 67 | 33 | 12 | 1100 | 94 | 4 | 6 | 0.25 |
| 4 | 67 | 33 | 12 | 500 | 96.5 | 7 | 6 | 0.25 |
| 5 | 100 | 0 | 6 | 1700 | 95 | 4 | 17 | 0 |
| 6 | 100 | 0 | 6 | 500 | 96.5 | 7 | 17 | 0 |
| 7 | 67 | 33 | 12 | 1700 | 95 | 0 | 6 | 0.25 |
| 8 | 67 | 33 | 12 | 500 | 88 | 0 | 6 | 0.25 |
| 9 | 100 | 0 | 6 | 1700 | 98.5 | 0 | 17 | 0 |
| 10 | 100 | 0 | 6 | 500 | 88 | 0 | 17 | 0 |

Note: In Table 8, all the units for the addition are parts by weight.

[Measurement of Flowability]

The flowability of the resulting ferrite granules was evaluated by measuring a time required for dropping 50 g of the ferrite granules through a funnel defined according to JIS Z2502 (sec./50 g). The results of the measurement are shown in Table 10.

[Molding of Ferrite Granules 1]

Subsequently, the ferrite granules obtained from Examples and Comparative Examples were dry molded under a pressure of 98 MPa to obtain a rectangular parallelepiped block having 55 mm in length, 12 mm in width, and 5 mm in height. The deflective strength of the rectangular parallelepiped block was measured according to JIS R1601 using a load tester (available from AIKO Engineering Co., Ltd.). The results are shown in Table 10 as the deflective strength 1.

The deflective strength 1 is a measurement for the mechanical strength of the ferrite green body, and indicates that higher the value is, higher the mechanical strength of the ferrite green body.

The ferrite green body blocks obtained from Examples were found to have good deflective strengths. In contrast, as for the ferrite green body obtained from Comparative Examples, their deflective strengths were clearly poorer than those obtained from Examples 25 to 31. Since the deflective strength has a closely relationship with the amount of the granule boundary within the ferrite green body, the deflective strength becomes lower unless the problem concerning the granule boundary is sufficiently solved. For this reason, it can be indicated that Comparative Examples could not solve the problem concerning the granule boundary.

[Sintering of Green Body 1]

The ferrite granules obtained by Examples and Comparative Examples were dry molded under a pressure of 98 MPa to obtain a rectangular parallelepiped block having 55 mm in length, 12 mm in width, and 5 mm in height. The resulting green body blocks were sintered at a temperature of 1050° C. over a period of 2 hours to thereby obtain ferrite sintered body blocks. The deflective strength of the ferrite sintered body block was measured according to JIS R1601 using a load tester (available from AIKO Engineering Co., Ltd.). The results are shown in Table 10 as the deflective strength 2.

The deflective strength 2 is a measurement for the mechanical strength of the ferrite sintered body, and indicates that higher the value is, higher the mechanical strength of the ferrite sintered body.

The ferrite sintered body blocks obtained from Examples 25 to 31 had good deflective strength on average. In contrast, the ferrite sintered body blocks obtained from Comparative Examples had poorer deflective strength.

TABLE 9

| | Raw Material No. | Granulation | Additive | HLB | Amount (Parts by Weight) |
|---|---|---|---|---|---|
| Ex. 25 | 1 | Spray Drying | 50 wt % Sorbitan Monooleic Acid in EtOH | 4 | 0.5 |
| EX. 26 | 2 | Spray Drying | 50 wt % Sorbitan Sesquioleic Acid in EtOH | 4 | 1.0 |
| EX. 27 | 2 | Spray Drying | 50 wt % Polyoxyethylene Sorbitan Monooleic Acid in EtOH | 8 | 0.5 |

TABLE 9-continued

| | Raw Material No. | Granulation | Additive | HLB | Amount (Parts by Weight) |
|---|---|---|---|---|---|
| EX. 28 | 3 | Spray Drying | 50 wt % Polyoxyethylene Sorbitan Monooleic Acid in EtOH | 10 | 0.5 |
| EX. 29 | 4 | Spray Drying | 50 wt % Polyoxyethylene Sorbitan Monooleic Acid in EtOH | 14 | 1.0 |
| EX. 30 | 5 | Oscillating Extrusion | 50 wt % Sorbitan Monooleic Acid in EtOH | 4 | 0.5 |
| EX. 31 | 6 | Oscillating Extrusion | 50 wt % Sorbitan Monooleic Acid in EtOH | 4 | 0.5 |
| Comp. 19 | 7 | Spray Drying | 50 wt % Sorbitan Sesquioleic Acid in EtOH | 4 | 0.5 |
| Comp. 20 | 7 | Spray Drying | — | — | — |
| Comp. 21 | 7 | Spray Drying | 50 wt % Polyoxyethylene Sorbitan Monooleic Acid in EtOH | 15 | 0.5 |
| Comp. 22 | 8 | Spray Drying | 50 wt % Sorbitan Sesquioleic Acid in EtOH | 4 | 0.5 |
| Comp. 23 | 9 | Oscillating Extrusion | 50 wt % Sorbitan Sesquioleic Acid in EtOH | 4 | 0.5 |
| Comp. 24 | 10 | Oscillating Extrusion | 50 wt % Polyoxyethylene Sorbitan Monostearic Acid in EtOH | 17 | 0.5 |

[Molding of Ferrite Granules 2]

Subsequently, 1.5 g of each of ferrite granules obtained from each of Examples and Comparative Examples were packed into a mold having 6 mm in diameter, and dry molded varying the molding pressure from 49 to 294 MPa to produce cylindrical ferrite green bodies having 6 mm in diameter and 16 to 19 mm in length. These samples were used to evaluate the relation between the molding pressure and the density of the green body. The results of the density of the green bodies at the molding pressure of 98 MPa are shown in Table 10.

According to Table 10, the cylindrical ferrite green bodies obtained from Examples 25 to 31 had high densities of the green bodies on average. In contrast, with regard to the cylindrical green bodies obtained in Comparative Examples 19 to 24, they had lower densities of the green bodies than those of Examples.

Figure 10:
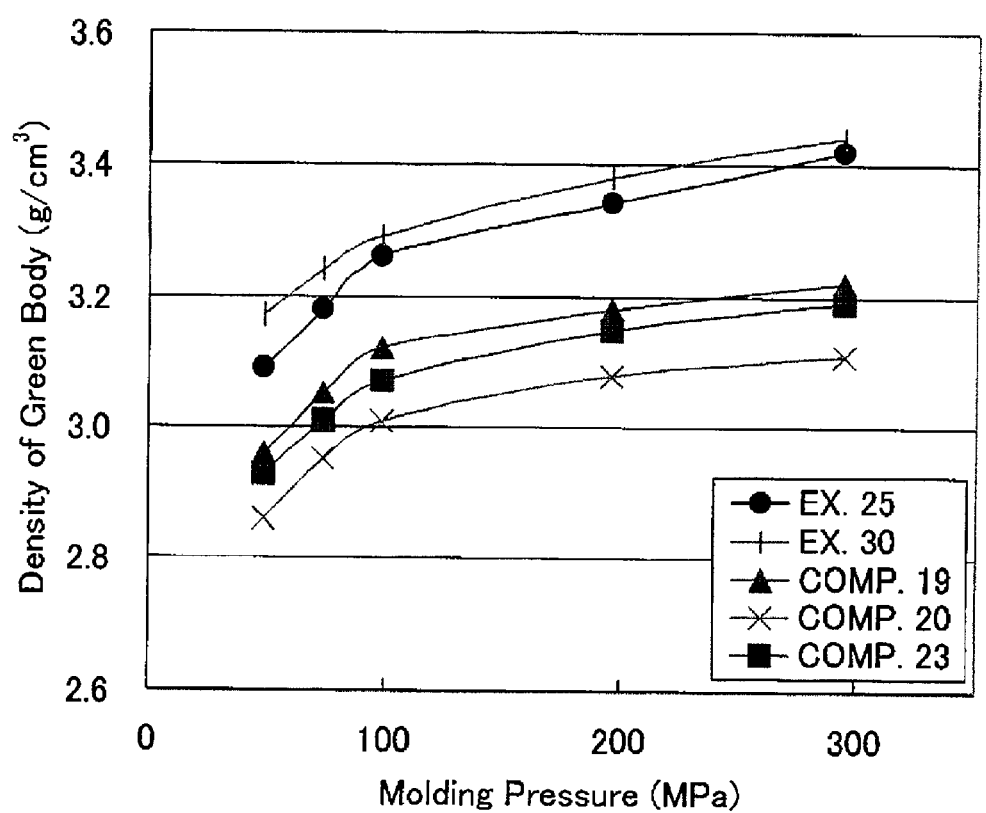
FIG. 10 is a graph showing the relation between the molding pressure and the density of the green body in Examples according to the third aspect of the present invention and Comparative Examples.

Also, the relation between the molding pressure and the density of the green body in Examples 25 and 30 and Comparative Examples 19, 20 and 23 are shown in FIG. 10.

According to FIG. 10, irrevent to Examples and Comparative Examples, the density of the ferrite green body is sharply increased with increasing of the molding pressure up to approximately 100 MPa. When the molding pressure exceeds 100 MPa, the increasing of the density of the ferrite green body becomes moderate. Considering these five graphs have almost parallel changes, it can be deduced that they are not reversed even if the molding pressure is further increased.

Figure 11:
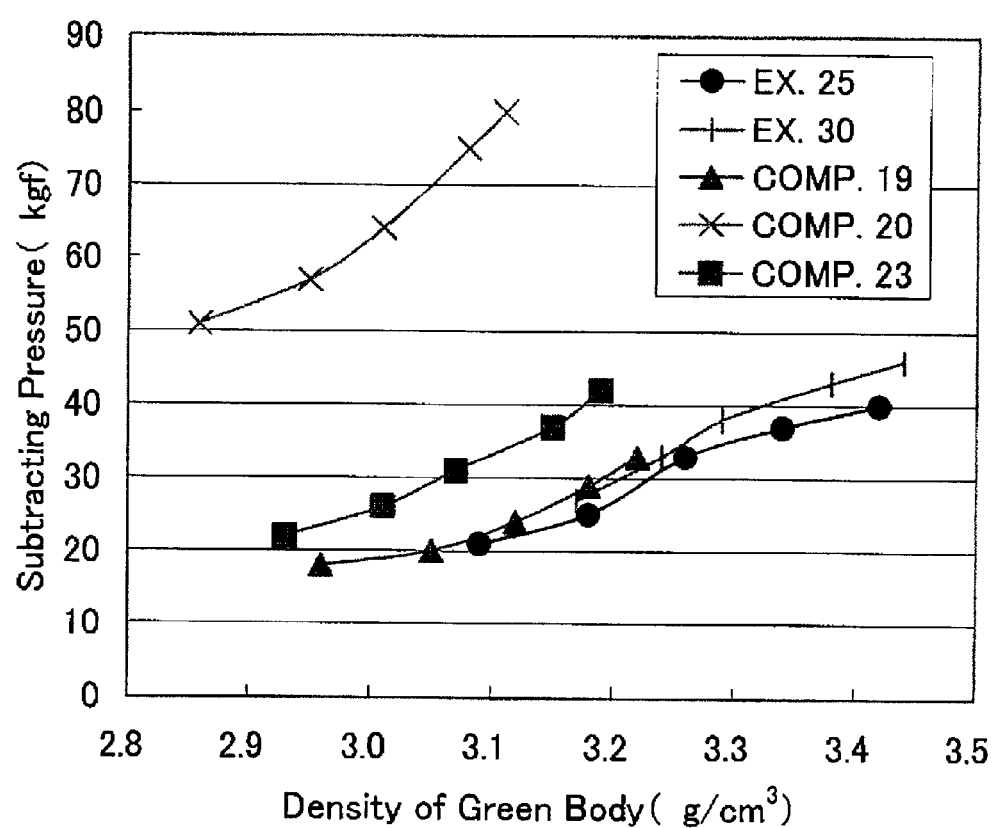
FIG. 11 shows the relation between the density of green body and the pressure for subtracting the green body from the mold according the third aspect of the present invention.

Also, the relation between the density of green body and the pressure for subtracting the green body from the mold are shown in FIG. 11.

As for the pressure for subtracting the green body from the mold, lower the pressure is easier to take the green body off from the mold.

According to FIG. 11, the pressure for subtracting the green body from the mold in Comparative Example 20 where no hexitan higher aliphatic acid ester was added was very poor, indicating that the ferrite green body obtained from Comparative Example 20 had poor mold releasing property from the mold.

Figure 12:
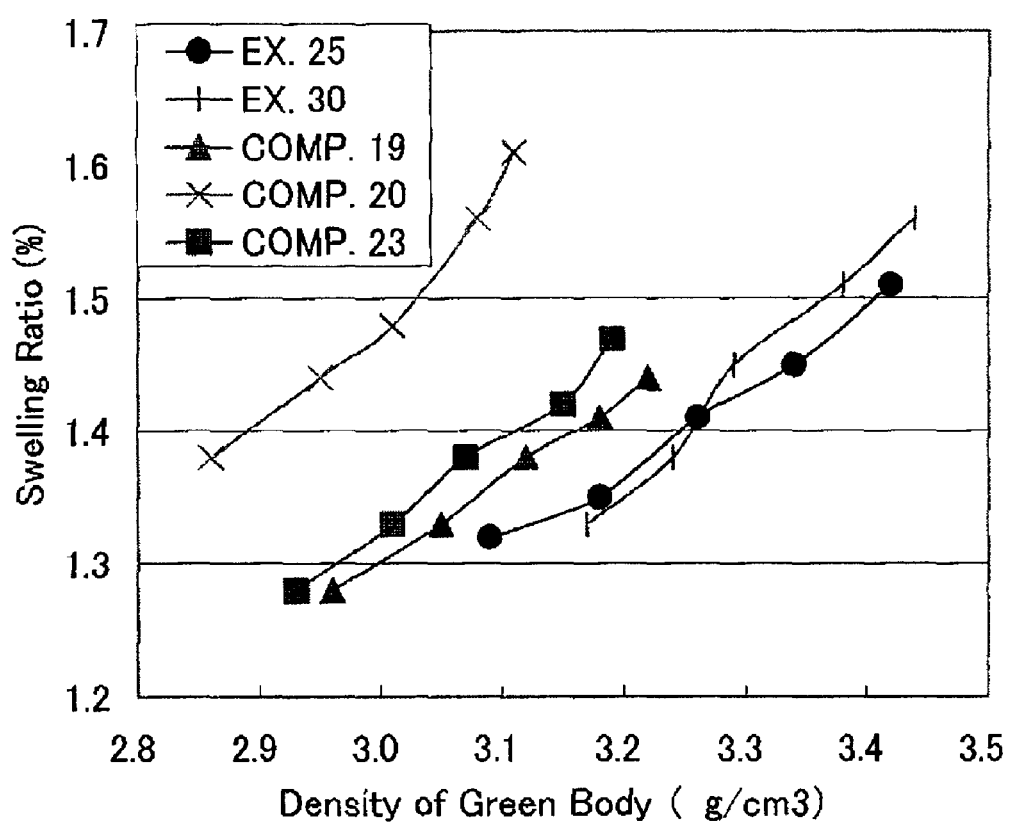
FIG. 12 shows the relation between the density of the ferrite green body and the swelling ratio of the ferrite green body (change in spring back) according the third aspect of the present invention.

FIG. 12 shows the relation between the density of the ferrite green body and the swelling ratio of the ferrite green body (change in spring back).

According to FIG. 12, comparing Examples with Comparative Example at the same density of the green body, the green bodies in Comparative Examples had higher swelling ratio of the ferrite green body. Particularly, in Comparative Example 20 where no hexitan higher aliphatic acid ester was added, the swelling ratio of the ferrite green body was found to be extremely high. Also, in Examples 19 and 23 where the hexitan higher aliphatic acid ester was added but unmodified polyvinyl alcohol was added as the binder component, the swelling ratio of the ferrite green body was found to be lower than those of Examples 25 and 30.

[Photos of Side Surfaces]

The ferrite granules obtained from Example 25 and Comparative Examples 19 (each 1.5 g) were packed in a mold having a diameter of 6 mm, and molded at a molding pressure of 147 MPa to produce cylindrical ferrite green bodies having 6 mm in diameter and length in from 16 to 19 mm. FIG. 13 shows the results of the observation where the situations of the granules were observed by a scanning electron microscope (SEM). FIGS. 13A, 13B and 13C each shows sides of an upper portion, a middle portion and a lower portion of the ferrite granule obtained under the conditions of Example 25, while FIGS. 13D, 13E and 13F each shows sides of an upper portion, a middle portion and a lower portion of the ferrite granule obtained under the conditions of Comparative Example 19.

The terms "upper portion", "middle portion" and "lower portion" of the ferrite granule intended herein mean relative distances from the pushing means for pushing the mold, where the upper portion indicates the side of the ferrite green body near the pushing means, the lower portion indicates the side of the ferrite green body farthest from the pushing means, and the middle portion indicates the side of the ferrite green body near the middle portion between the upper and the lower portions.

It can be confirmed from FIGS. 13A, 13B and 13C that the granule boundaries of the ferrite granule are very small on all of portions in the Example 25 so that they can be evaluated only with difficulty. In contrast, in Comparative Example 19 (FIGS. 13D, 13E, and 13F), the granule boundaries of the ferrite granule can be proven to be very large and to be different from each other depending upon the observation portions. This shows that the crushing property at a low pressure in Comparative Example 19 is poorer than that in Example 25 and that the pressure transmitting property is worse and, thus, the molding pressure could not be uniformly transmitted to the lower portion.

TABLE 10

| | Flowability (Sec./50 g) | Density of Green Body (g/cm³) | Deflective Strength 1 (MPa) | Deflective Strength 2 (MPa) |
|---|---|---|---|---|
| Example 25 | 20 | 3.26 | 1.6 | 43 |
| Example 26 | 19 | 3.31 | 1.7 | 45 |
| Example 27 | 20 | 3.29 | 1.6 | 44 |
| Example 28 | 20 | 3.27 | 1.5 | 43 |
| Example 29 | 19 | 3.34 | 1.3 | 44 |

TABLE 10-continued

| | Flowability (Sec./50 g) | Density of Green Body (g/cm³) | Deflective Strength 1 (MPa) | Deflective Strength 2 (MPa) |
|---|---|---|---|---|
| Example 30 | 23 | 3.29 | 1.6 | 42 |
| Example 31 | 24 | 3.35 | 1.5 | 43 |
| Comparative 19 | 21 | 3.12 | 0.7 | 29 |
| Comparative 20 | 22 | 3.01 | 0.7 | 30 |
| Comparative 21 | 21 | 3.08 | 0.3 | 27 |
| Comparative 22 | 22 | 3.11 | 0.7 | 33 |
| Comparative 23 | 25 | 3.07 | 1.0 | 27 |
| Comparative 24 | 28 | 3.15 | 0.4 | 29 |

From the results of Table 10 and FIGS. 10 to 13, it has been found that by producing ferrite granule by the use of the ethylene modified polyvinyl alcohol and then covering the surfaces of the resulting granules with hexitan higher aliphatic acid ester, the lubricity and the flowability are enhanced, the crushing property at a low pressure during the course of the molding is improved, the granule boundary of the ferrite green body is decreased, and could produce sintered bodies with decreased internal defects, significantly improving the strength, i.e., satisfied results could be obtained.

In contrast, the ferrite granules produced out of the conditions defined in the present invention, the pressure for subtracting the green body from the mold becomes poor, the swelling ratio of the green body becomes high, the crushing property at a low pressure during the course of the molding is poor, many granule boundaries remain in the ferrite green body, and the strength of the ferrite green body is low. Also, due to internal defective, the strength of the ferrite sintered body becomes remarkably poor.

[Evaluation of Continuous Moldability]

Ferrite green bodies were continuously produced using the ferrite granules obtained from Examples 25 and 30 and Comparative Examples 19, 20, and 24. The ferrite green body thus molded had a cylindrical core shape measuring 1.8 mm in diameter, 2.0 mm in length, and 1000 of the green bodies were continuously produced from each granule. The resulting ferrite green bodies were shaved through a diamond wheel to be 0.8 mm in core diameter to produce a drum core, which was then sintered at a temperature of 1060° C. to thereby obtain ferrite sintered bodies. The evolution results of the ferrite green bodies and sintered bodies are shown in Table 11.

The evaluation criteria for cracking, sticking and chipping are given in Table 12.

TABLE 11

| | Evaluation Items | Example 25 | Example 30 | Comp. 19 | Comp. 20 | Comp. 24 |
|---|---|---|---|---|---|---|
| Ferrite Green Body | Sticking | ◯ | ◯ | ◯ | ◯ | ▲ |
| | Chipping | ◯ | ◯ | Δ | Δ | Δ |
| | Cracking | ◯ | ◯ | Δ | Δ | Δ |
| | Bending | ◯ | ◯ | Δ | Δ | Δ |
| Ferrite Sintered Body | Chipping | ◯ | ◯ | Δ | Δ | Δ |
| | Cracking | ◯ | ◯ | Δ | ▲ | ▲ |
| | Bending | ◯ | ◯ | Δ | ▲ | ▲ |

TABLE 12

|   | Sticking | Chipping | Cracking | Bending |
|---|---|---|---|---|
| ○ | Not Generated | 0–5 | 0–5 | 0–3 |
| Δ | Generated at 5000 moldings | 6–20 | 6–20 | 4–15 |
| ▲ | Generated at 1000 moldings | 21–50 | 21–50 | 15–30 |

It can be seen from the results given in Table 11 that no sticking, cracking, breaking, or bending occurred in the ferrite green bodies and sintered bodies produced from ferrite granules of Examples in which the ethylene modified vinyl alcohol having the above properties was used for the granulation and the ferrite granules were covered with hexitan higher aliphatic acid ester.

What is claimed is:

1. A process for producing ferrite granules by granulating a composition for producing granules for molding ferrite, which uses a composition comprising a ferrite slurry at least having raw ferrite powder;

an ethylene-modified polyvinyl alcohol consisting essentially of a polyvinyl alcohol series polymer, wherein the ethylene modified amount of said ethylene-modified polyvinyl alcohol is from 4 to 10 mol %, average polymerization degree is from 500 to 1700, and average saponification degree is from 90.0 to 99.5 mol %; and water mixed therewith;

wherein said composition is granulated by a spray drying process using a spray dryer.

2. The process according to claim 1, wherein the average saponification degree of said ethylene-modified polyvinyl alcohol is from 92 to 97 mol %, and wherein said composition is granulated by a spray drying process using a spray dryer.

3. The process according to claim 1, wherein the amount of the ethylene-modified polyvinyl alcohol added is from 0.4 to 5 parts by weight based on 100 parts weight of raw ferrite powder, and wherein said composition is granulated by a spray drying process using a spray dryer.

4. The process according to claim 1, wherein the composition further comprises 0.1 to 0.5 parts by weight of a polyethylene glycol having a molecular weight of from 1000 to 6000 based on 100 parts by weight of the raw ferrite powder, and wherein said composition is granulated by a spray drying process using a spray dryer.

5. The process according to claim 1, wherein the composition further comprises 0.1 to 1 parts by weight of water-dispersible wax based on 100 parts by weight of the raw ferrite powder, and wherein said composition is granulated by a spray drying process using a spray dryer.

6. The process according to any one of claims 1, 2, 3, 4, and 5, wherein the granulation is performed under the conditions that the inlet temperature of the spray dryer is in the range of from 170 to 230° C. and the outlet temperature of the spray dryer is in the range of from 65 to 125° C.

7. Ferrite granules for molding ferrite granulated by a process according to any one of claims 1, 2, 3, 4, and 5.

8. Ferrite granules for molding ferrite granulated by a process according to claim 6.

9. The ferrite granules according to claim 7, wherein at least part of the surface is covered with hexitan higher aliphatic acid ester having a hydrophilicity/oilphilicity ratio of 14 or less.

10. The ferrite granules according to claim 8 wherein at least part of the surface is covered with hexitan higher aliphatic acid ester having a hydrophilicity/oilphilicity ratio of 14 or less.

11. A ferrite green body produced by dry-pressing ferrite granules of claim 7.

12. A ferrite green body produced by dry-pressing ferrite granules of claim 8.

13. A ferrite green body produced by dry-pressing ferrite granules of claim 9.

14. A ferrite green body produced by dry-pressing ferrite granules of claim 10.

* * * * *